United States Patent
Kitagawa

(10) Patent No.: US 10,723,247 B2
(45) Date of Patent: Jul. 28, 2020

(54) VEHICLE SEAT

(71) Applicant: TOYOTA JIDOSHA KABUSHIKI KAISHA, Toyota-shi, Aichi-ken (JP)

(72) Inventor: Yuichi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 16/108,670

(22) Filed: Aug. 22, 2018

(65) Prior Publication Data

US 2019/0106028 A1 Apr. 11, 2019

(30) Foreign Application Priority Data

Oct. 10, 2017 (JP) .................... 2017-196977

(51) Int. Cl.
| | |
|---|---|
| *B60N 2/42* | (2006.01) |
| *B60N 2/68* | (2006.01) |
| *B60N 2/427* | (2006.01) |
| *B60R 21/01* | (2006.01) |
| *B60R 21/02* | (2006.01) |

(52) U.S. Cl.
CPC ....... *B60N 2/42727* (2013.01); *B60N 2/4221* (2013.01); *B60N 2/42754* (2013.01); *B60N 2/42781* (2013.01); *B60N 2/68* (2013.01); *B60R 2021/01013* (2013.01); *B60R 2021/01252* (2013.01); *B60R 2021/022* (2013.01)

(58) Field of Classification Search
CPC ..... B60R 21/02; B60R 2021/022; B60N 2/42; B60N 2/4221; B60N 2/427; B60N 2/42727; B60N 2/42736; B60N 2/42754; B60N 2/42781; B60N 2/62; B60N 2/68
See application file for complete search history.

(56) References Cited

U.S. PATENT DOCUMENTS

| | | | | |
|---|---|---|---|---|
| 4,225,178 | A * | 9/1980 | Takada ................ | B60N 2/4221 248/561 |
| 6,921,133 | B2 * | 7/2005 | Taoka ................. | B60N 2/2803 297/216.11 |
| 7,740,311 | B2 * | 6/2010 | Taoka ................. | B60N 2/4221 297/216.1 |
| 2018/0086237 | A1 * | 3/2018 | Couasnon ............ | B60N 2/165 |

FOREIGN PATENT DOCUMENTS

| | | |
|---|---|---|
| JP | 2001-146127 A | 5/2001 |
| JP | 2002-240608 A | 8/2002 |
| WO | WO-02066285 A1 * | 8/2002 ......... B60N 2/42763 |

* cited by examiner

*Primary Examiner* — Ryan D Kwiecinski
(74) *Attorney, Agent, or Firm* — Oliff PLC

(57) ABSTRACT

A vehicle seat, which is provided with a collision prediction sensor and with a seat cushion having a seat cushion top face and a seat cushion frame, includes: a pelvis movement suppression member disposed along a seat width direction inside a front portion of the seat cushion; a vertical movement-enabling unit supporting the pelvis movement suppression member at the seat cushion frame and allowing vertical movement of the pelvis movement suppression member to follow vertical movement of the seat cushion top face; and a stopper unit attached to the seat cushion frame and, in a case in which a rapid deceleration of a vehicle is detected or a collision of the vehicle is predicted by the collision prediction sensor, restricting downward movement of the pelvis movement suppression member.

3 Claims, 17 Drawing Sheets

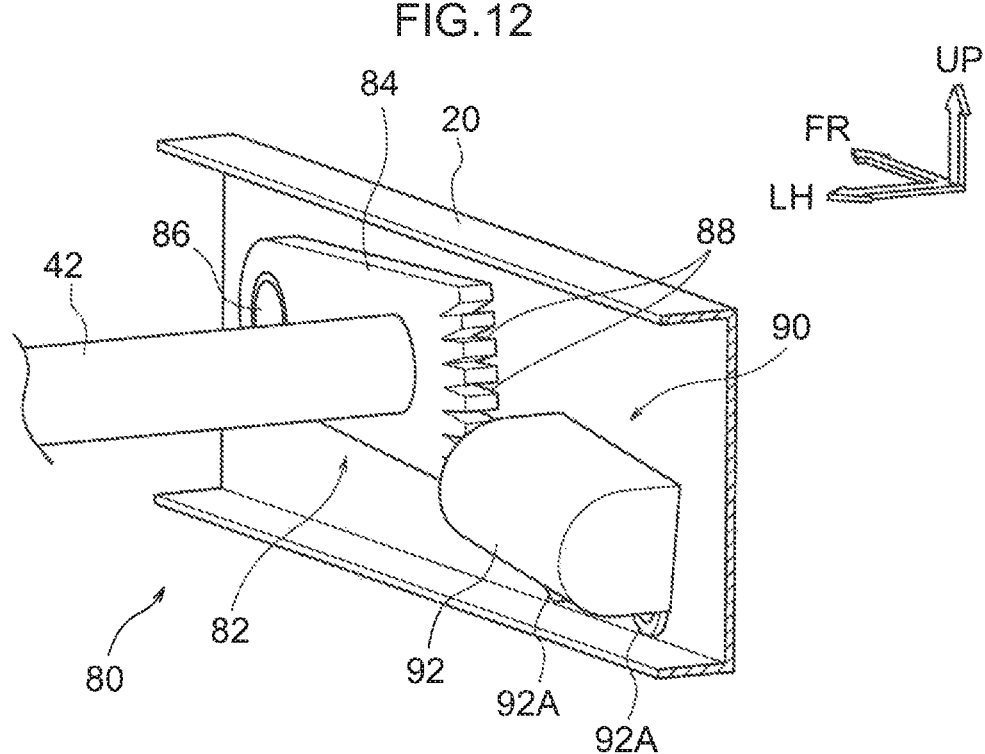
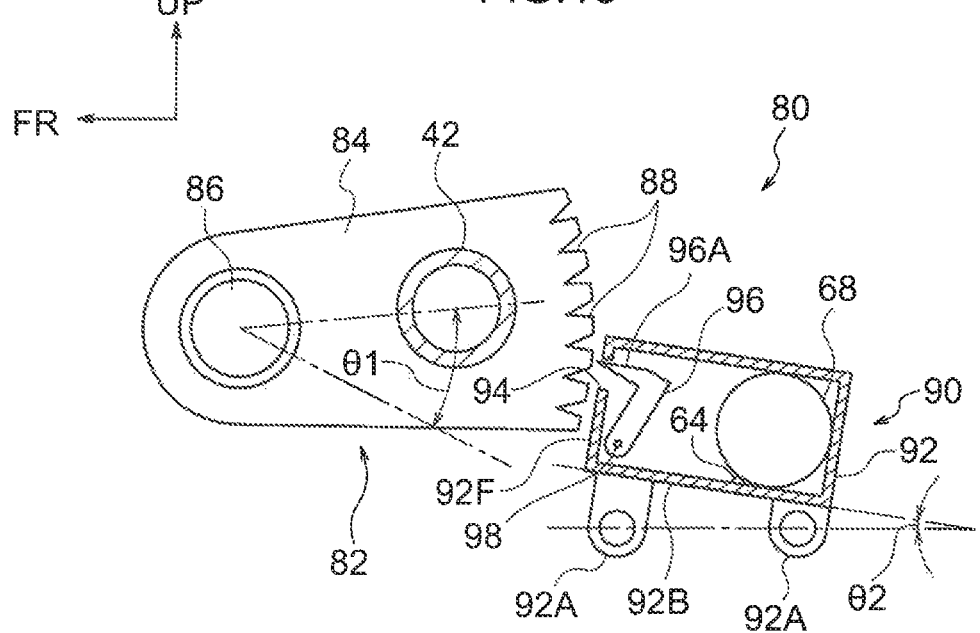

VEHICLE SEAT

CROSS-REFERENCE TO RELATED APPLICATION

This application claims priority under 35 USC 119 from Japanese Patent Application No. 2017-196977 filed Oct. 10, 2017, the disclosure of which is incorporated by reference herein in its entirety.

BACKGROUND

Technical Field

Preferred embodiments relate to a vehicle seat.

Related Art

In a car seat recited in Japanese Patent Application Laid-Open (JP-A) No. 2001-146127, a stopper member that extends in a width direction of a seat cushion is disposed inside a seat cushion front portion. This stopper member is supported by a guide member to be freely movable only in a vertical direction, and is urged upward by a compression spring. During usual sitting, the stopper member descends in opposition to the compression spring, thus avoiding sitting comfort becoming poor. When the buttock area of an occupant acts to move forward during a rapid deceleration of the vehicle, the stopper member that is movable only in the vertical direction meshes with protrusions and indentations provided at the guide member due to being pressed from the rear. Thus, downward movement of the stopper member is blocked. As a result, forward movement of the pelvis area of the occupant is suppressed.

JP-A No. 2001-146127 recites the provision of a further downward movement blocking mechanism that blocks downward movement of the stopper member. This downward movement blocking mechanism operates in conjunction with an inner pre-tensioner of a seatbelt during a rapid deceleration of the vehicle. Because this inner pre-tensioner is used, downward movement of the stopper member is reliably blocked during a rapid deceleration without an additional driving mechanism being provided.

In a car seat recited in JP-A No. 2002-240608, an engaging member is disposed at a stopper member similar to that described above. When pressed from the seat rear, this engaging member protrudes forward from the stopper member and bites into a seat cushion pad or the like. As a result, downward movement of the stopper member during a rapid deceleration of the vehicle is assuredly blocked by a simple structure.

SUMMARY

However, in the conventional technologies recited in the publications described above, in a case in which a timing for blocking downward movement of a stopper member is delayed during a rapid deceleration of a vehicle, it may not be possible to reliably block the downward movement of the stopper member. That is, in a structure which uses forward movement of an occupant's pelvis area to press a stopper member from the seat rear side, the stopper member may be pushed down by the thigh area of the occupant and moved downward before pressure from the seat rear side has risen sufficiently.

Further, in a structure in which an inner pre-tensioner of a seatbelt is deployed to block downward movement of a stopper member, the stopper member may be pushed down by the thigh area of the occupant and moved downward before a vehicle acceleration after a vehicle collision or the like is detected and the inner pre-tensioner is activated. Therefore, in the technologies recited in the publications described above, forward movement of the pelvis area of an occupant during a rapid deceleration of the vehicle may not be thoroughly suppressed.

In consideration of the above circumstances, an object of preferred embodiments is to provide a vehicle seat capable of effectively suppressing forward movement of an occupant's pelvis area during a rapid deceleration of a vehicle, without impairing sitting comfort at usual times.

A vehicle seat provided with a collision prediction sensor and with a seat cushion having a seat cushion top face and a seat cushion frame, and, according to a first aspect of the present disclosure includes: a pelvis movement suppression member disposed along a seat width direction inside a front portion of the seat cushion; a vertical movement-enabling unit supporting the pelvis movement suppression member at the seat cushion frame and allowing vertical movement of the pelvis movement suppression member to follow vertical movement of the seat cushion top face; and a stopper unit attached to the seat cushion frame and, in a case in which a rapid deceleration of a vehicle is detected or a collision of the vehicle is predicted by the collision prediction sensor, restricting downward movement of the pelvis movement suppression member.

In the vehicle seat of the first aspect, the pelvis movement suppression member, that is disposed along the seat width direction inside the front portion of the seat cushion, is supported at the seat cushion frame via the vertical movement-enabling unit. The vertical movement-enabling unit allows vertical movement of the pelvis movement suppression member so as to follow vertical movement of the seat cushion top face. When the seat cushion top face is moved vertically by a load from an occupant sitting on the seat cushion, or by vibrations during vehicle running and the like, the pelvis movement suppression member moves vertically together with the seat cushion top face. Therefore, the occupant is unlikely to sense the pelvis movement suppression member as a foreign body. Thus, impairment of sitting comfort at usual times may be avoided.

When the stopper unit attached to the seat cushion frame senses a rapid deceleration of the vehicle or the collision prediction sensor predicts a collision of the vehicle, the stopper unit restricts downward movement of the pelvis movement suppression member. Downward movement of the pelvis movement suppression member may be restricted at a point in time before the pelvis area of the occupant moves forward due to the rapid deceleration of the vehicle. Thus, the vertical position of the pelvis movement suppression member may be maintained virtually unaltered from a usual time and downward movement of the pelvis movement suppression member may be restricted. Consequently, when the pelvis area of the occupant acts to move forward due to the rapid deceleration of the vehicle, the forward movement of the pelvis area of the occupant may be suppressed effectively by the pelvis movement suppression member.

In a vehicle seat according to a second aspect of the present disclosure, in the first aspect, the pelvis movement suppression member is formed in a rod shape. The vertical movement-enabling unit includes a movable member that is supported so as to be vertically slidable relative to the seat cushion frame, an end portion in the seat width direction of the pelvis movement suppression member is fixed to the movable member, and plural notches that are formed so as to be arrayed vertically at the movable member. The stopper unit includes a pawl member that restricts the downward movement of the pelvis movement suppression member by meshing with at least one of the plural notches at the movable member.

In the vehicle seat of the second aspect, the pelvis movement suppression member formed in the rod shape is disposed along the seat width direction inside the front portion of the seat cushion. The end portion in the seat width direction of the pelvis movement suppression member is fixed to the movable member of the vertical movement-enabling unit. The movable member is supported to be vertically slidable relative to the seat cushion frame. At usual sitting times, the pelvis movement suppression member slides vertically following vertical movements of the seat cushion top face.

The plural notches are formed so as to be arrayed vertically at the movable member. When the stopper unit senses a rapid deceleration of the vehicle or the collision prediction sensor predicts a collision of the vehicle, the pawl member of the stopper unit meshes with at least one of the plural notches. As a result, downward movement of the pelvis movement suppression member is restricted. In this aspect, because the movable member of the vertical movement-enabling unit is supported to be slidable vertically relative to the seat cushion frame, a strength required to suppress forward movement of the occupant's pelvis area during a rapid deceleration of the vehicle is more easily assured than in a structure in which the movable member is supported to be vertically rotatable (swingable) relative to the seat cushion frame.

In a vehicle seat according to a third aspect of the present disclosure, in the first aspect, the pelvis movement suppression member is formed in a rod shape. The vertical movement-enabling unit includes a movable member that is supported at the seat cushion frame so as to be rotatable about an axis in the seat width direction. An end portion in the seat width direction of the pelvis movement suppression member is fixed to the movable member at one side in a seat front-and-rear direction relative to a rotation center of the movable member. Plural notches are formed at an end portion at the one side of the movable member so as to be arrayed in a rotation direction of the movable member. The stopper unit includes a pawl member that restricts the downward movement of the pelvis movement suppression member by meshing with at least one of the plural notches of the movable member.

In the vehicle seat of the third aspect, the pelvis movement suppression member formed in the rod shape is disposed along the seat width direction inside the front portion of the seat cushion. The end portion in the seat width direction of the pelvis movement suppression member is fixed to the movable member of the vertical movement-enabling unit. The movable member is supported at the seat cushion frame so as to be rotatable about the axis in the seat width direction, and the pelvis movement suppression member is fixed at the one side in the seat front-and-rear direction relative to the rotation center of the movable member. Therefore, at usual sitting times, the pelvis movement suppression member rotates vertically about the rotation center following vertical movements of the seat cushion top face.

The plural notches are formed at the end portion at the one side of the movable member so as to be arrayed in the rotation direction of the movable member. When the stopper unit senses a rapid deceleration of the vehicle or the collision prediction sensor predicts a collision of the vehicle, the pawl member of the stopper unit meshes with at least one of the plural notches. As a result, downward movement of the pelvis movement suppression member is restricted. Because the pelvis movement suppression member is moved vertically by rotation of the movable member, the pelvis movement suppression member may be vertically moved more smoothly than in a structure in which the movable member slides vertically. Therefore, a sensation for the occupant of the pelvis movement suppression member as a foreign body may be further reduced.

In a vehicle seat according to a fourth aspect of the present disclosure, in the second aspect or third aspect, a central portion in the seat width direction of the pelvis movement suppression member is inflected so as to protrude upward, and portions at both sides in the seat width direction of the pelvis movement suppression member are inflected so as to protrude downward.

In the vehicle seat of the fourth aspect, the portions at the both sides in the seat width direction of the pelvis movement suppression member are inflected so as to protrude downward. As a result, spaces between the portions at the both sides in the seat width direction of the pelvis movement suppression member and left and right thigh areas of an occupant may be assuredly larger than in a structure in which the pelvis movement suppression member is formed in a completely straight rod shape. Moreover, distances between lower faces (curved faces) of the left and right thigh areas and the pelvis movement suppression member are closer to being constant in the seat width direction than in a structure in which the pelvis movement suppression member is formed in a completely straight rod shape. Consequently, a sensation for the occupant of the pelvis movement suppression member as a foreign body may be further reduced. In addition, because the central portion in the seat width direction of the pelvis movement suppression member is inflected so as to protrude upward, a range of interference between the ischial bones of the occupant and the pelvis movement suppression member during a rapid deceleration of the vehicle is widened. As a result, forward movement of the occupant's pelvis area may be even more effectively suppressed.

In a vehicle seat according to a fifth aspect of the present disclosure, in the first aspect, the pelvis movement suppression member is flexible and is formed in a linear shape. The vertical movement-enabling unit includes an anchoring portion that anchors one end portion of the pelvis movement suppression member at one end portion in the seat width direction of the seat cushion frame, and a movable member that is formed in an elongated shape and that is supported so as to be slidable in a length direction thereof at another end portion in the seat width direction of the seat cushion frame. Another end portion of the pelvis movement suppression member is anchored at one end portion in a length direction of the movable member, and plural notches are formed at the movable member so as to be arrayed in the length direction of the movable member. The stopper unit includes a pawl member that restricts the downward movement of the pelvis movement suppression member by meshing with at least one of the plural notches at the movable member.

According to the vehicle seat of the fifth aspect, the pelvis movement suppression member is flexible, is formed in the linear shape, and is disposed along the seat width direction inside the front portion of the seat cushion inside. The one end portion of the pelvis movement suppression member is anchored at the one end portion in the seat width direction of the seat cushion frame by the anchoring portion of the vertical movement-enabling unit. The other end portion of the pelvis movement suppression member is anchored at the one end portion in the length direction of the movable member of the vertical movement-enabling unit. The movable member is supported at the other end portion in the seat width direction of the seat cushion frame so as to be slidable in the length direction. Therefore, during usual sitting, the above-described movable member slides relative to the seat cushion frame in accordance with an intermediate portion of the pelvis movement suppression member moving vertically to follow vertical movements of the seat cushion top face.

The plural notches arrayed in the length direction of the movable member are formed in the movable member. When the stopper unit senses a rapid deceleration of the vehicle or the collision prediction sensor predicts a collision of the vehicle, the pawl member of the stopper unit meshes with at least one of the plural notches. As a result, downward movement of the intermediate portion of the pelvis movement suppression member is restricted. Note that, the pelvis movement suppression member that is formed in the linear shape with flexibility flexes to follow vertical movements of the seat cushion top face. A sensation for the occupant of the pelvis movement suppression member as a foreign body may be even more effectively reduced. In addition, because the pelvis movement suppression member flexes as described above, this foreign body sensation is likely to be reduced regardless of the physical build of the occupant.

In a vehicle seat according to a sixth aspect of the present disclosure, in any of the second to fifth aspects, the stopper unit includes a pair of the pawl members which are arrayed in an array direction of the plural notches at the movable member, and a spacing is provided between the respective pawl members, the spacing differing slightly from a spacing between any two adjacent notches of the plural notches, and the stopper unit restricts the downward movement of the pelvis movement suppression member by one of the pair of pawl members meshing with at least one of the plural notches.

In the vehicle seat of the sixth aspect, when the stopper unit including the pair of pawl members senses a rapid deceleration of the vehicle or the collision prediction sensor predicts a collision of the vehicle, one of the pair of pawl members meshes with at least one of the plural notches at the movable member. As a result, downward movement of the pelvis movement suppression member is restricted. Note that, the spacing between the respective pawl members is different from the spacing (pitch) of any two adjacent notches of the plural notches. Therefore, there is a high probability of one of the pair of pawl members meshing with one of the plural notches. As a result, downward movement of the movable member, and thus the pelvis movement suppression member, may be restricted more reliably.

In a vehicle seat according to a seventh aspect of the present disclosure, in any of the second to sixth aspects, the plural notches are formed at an end portion at a seat rear side of the movable member; and the stopper unit includes a moving member that moves toward a seat front side due to deceleration of the vehicle and the moving member causes the pawl member to mesh with at least one of the plural notches.

In the vehicle seat of the seventh aspect, when the vehicle rapidly decelerates due to the vehicle rapidly braking or the vehicle colliding without braking, the moving member of the stopper unit is moved toward the seat front side by the deceleration. As a result, the pawl member of the stopper unit meshes with at least one of the plural notches formed at the movable member of the vertical movement-enabling unit. As a result, downward movement of the pelvis movement suppression member may be restricted by a simple structure.

In a vehicle seat according to an eighth aspect of the present disclosure, in any of the second to sixth aspects, the stopper unit includes an actuator that is actuated in a case in which a collision of the vehicle is predicted by the collision prediction sensor and the actuator causes the pawl member to mesh with at least one of the plural notches.

In the vehicle seat of the eighth aspect, the actuator of the stopper unit is activated in a case in which a collision of the vehicle is predicted by the collision prediction sensor. As a result, the pawl member of the stopper unit meshes with at least one of the plural notches formed at the movable member of the vertical movement-enabling unit. Because the actuator is employed as the stopper unit, an activation timing of the stopper unit may be specified arbitrarily.

In a vehicle seat according to a ninth aspect of the present disclosure, in the fifth aspect, the other end side of the pelvis movement suppression member is wound round a pulley that is supported so as to be rotatable relative to the other end portion, in the seat width direction, of the seat cushion frame, and the movable member is arranged with the length direction thereof in a direction orthogonal to the seat width direction.

According to the vehicle seat of the ninth aspect, the other end side of the pelvis movement suppression member formed in the linear shape with flexibility is wound round the pulley that is supported to be rotatable relative to the other end portion in the seat width direction of the seat cushion frame. The other end portion of the pelvis movement suppression member is anchored at one end portion in the length direction of the movable member, and the movable member is arranged with the length direction thereof in the direction orthogonal to the seat width direction. Therefore, space for arrangement of the vertical movement-enabling member may be more easily reserved than in, for example, a structure in which the movable member is arranged with the length direction thereof in the seat width direction.

As described above, a vehicle seat according to each aspect of the present disclosure may effectively suppress forward movement of an occupant's pelvis area during a rapid deceleration of the vehicle without impairing sitting comfort at usual times.

BRIEF DESCRIPTION OF DRAWINGS

FIG. 12 is a perspective view showing neighboring structures including a portion of an occupant movement suppression apparatus provided at a vehicle seat according to a second exemplary embodiment of the present invention.

FIG. 13 is a partial sectional diagram in which a portion of the structure illustrated in FIG. 12 is seen from the left of the vehicle.

DESCRIPTION OF EMBODIMENTS

First Exemplary Embodiment

Figure 1:
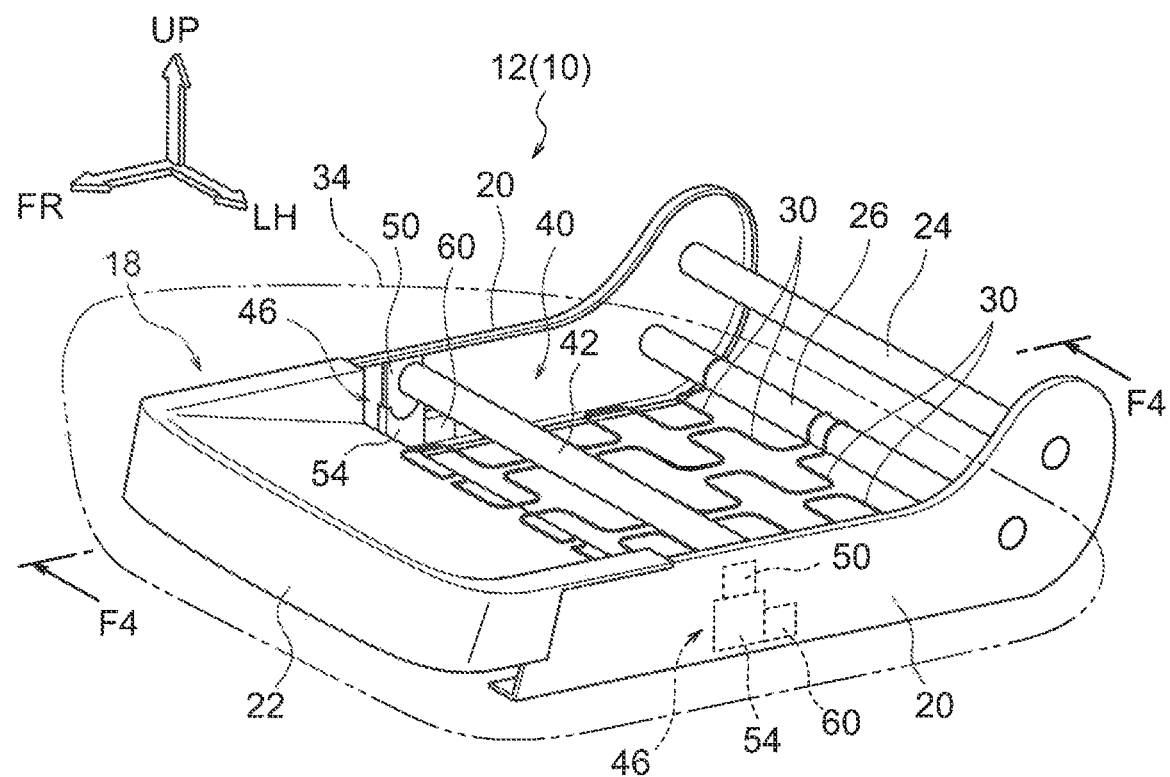
FIG. 1 is a perspective diagram showing a seat cushion frame and an occupant movement suppression apparatus provided at a seat cushion of a vehicle seat according to a first exemplary embodiment of the present invention.
Figure 2:
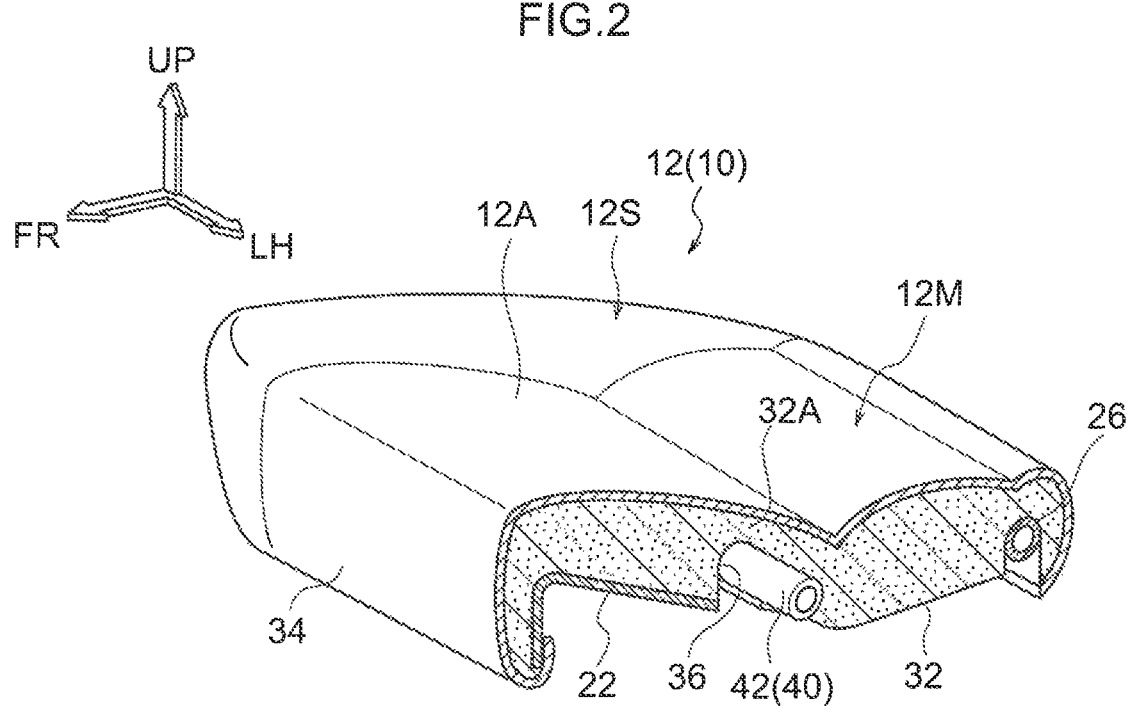
FIG. 2 is a perspective sectional diagram showing neighboring structures including a seat cushion pad of the seat cushion according to the first exemplary embodiment.
Figure 3:
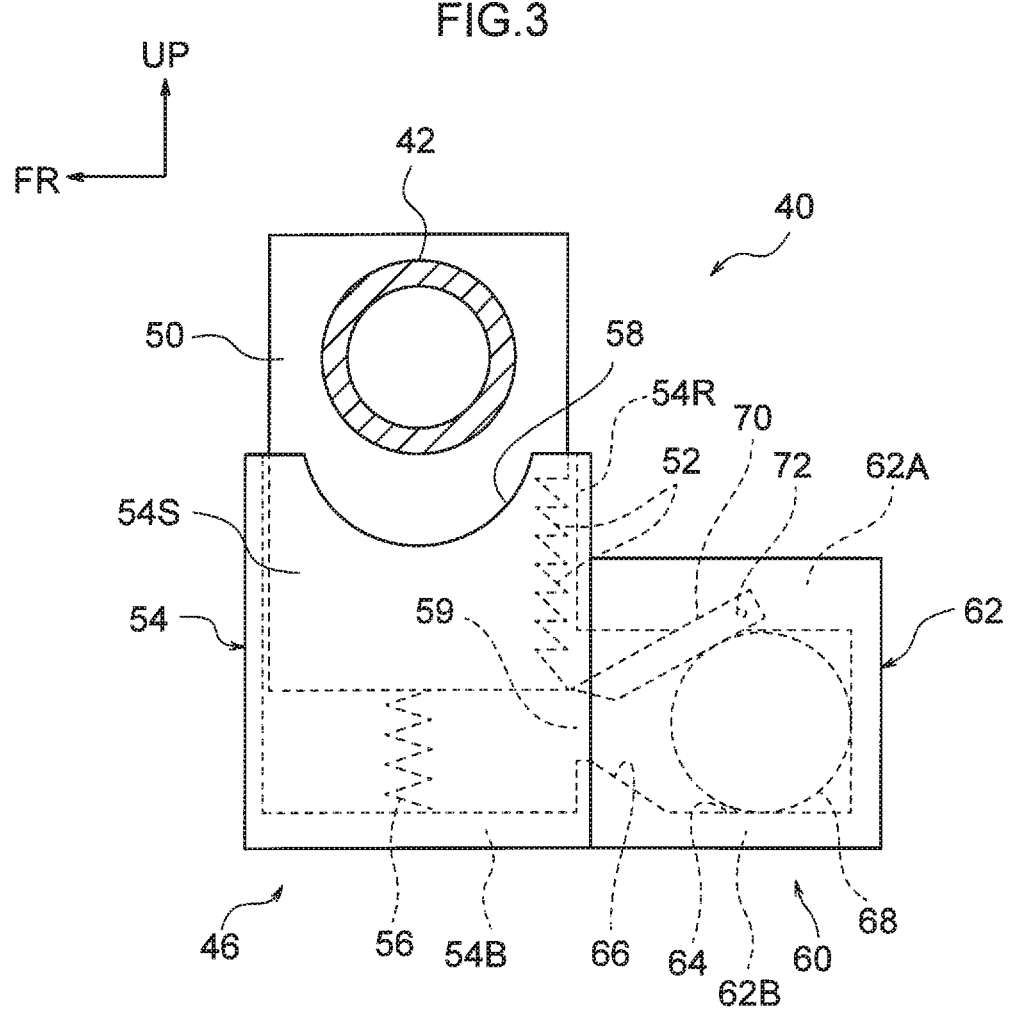
FIG. 3 is a side view of a vertical movement-enabling unit and a stopper unit of the occupant movement suppression apparatus according to the first exemplary embodiment.
Figure 4:
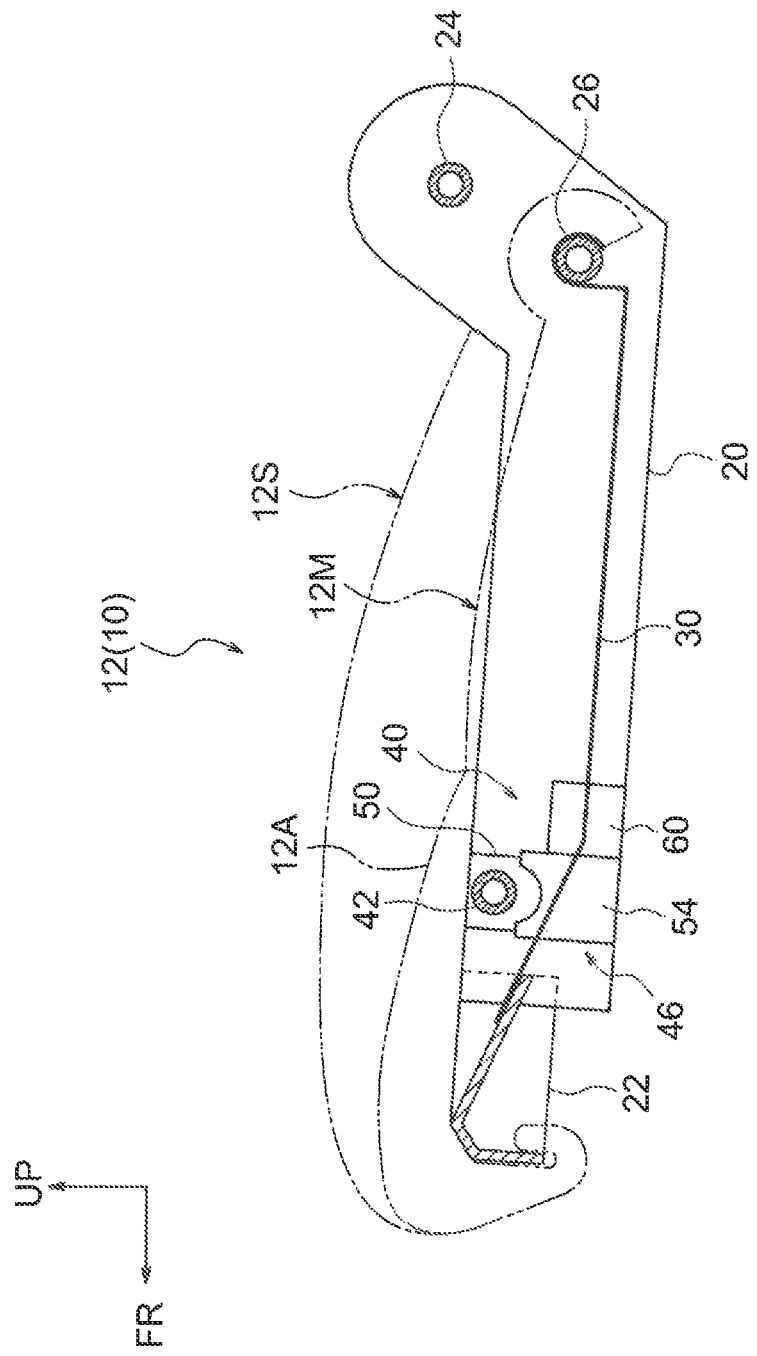
FIG. 4 is a sectional diagram showing a magnification in a plane cut along line F4-F4 in FIG. 1.

A vehicle seat 10 according to a first exemplary embodiment of the present invention is described below using FIG. 1 to FIG. 11. An arrow FR that is shown where appropriate in the drawings indicates the vehicle front direction, an arrow UP indicates the vehicle upper direction, and an arrow LH indicates a vehicle left direction. Below, where descriptions are given using directions to front and rear, left and right, and up and down, unless particularly specified, these refer to front and rear in the vehicle front-and-rear direction, left and right in the vehicle left-and-right direction (the vehicle width direction), and up and down in the vehicle vertical direction. Some of the reference symbols may be omitted in some of the drawings with a view to aiding viewing of the drawings.

—Structures—

As shown in FIG. 1, FIG. 2, FIG. 4, FIG. 5, and FIG. 8 to FIG. 10, the vehicle seat 10 according to the present exemplary embodiment is provided with a seat cushion 12. A lower end portion of a seat back 14 (see FIG. 8 to FIG. 10) is linked to a rear end portion of the seat cushion 12, and a headrest 16 (see FIG. 8 and FIG. 9) is linked to an upper end portion of the seat back 14. An occupant P sits on the vehicle seat 10 (see FIG. 5 and FIG. 8 to FIG. 10). A buttock area PB and thigh area PF of the occupant P are supported by the seat cushion 12, a back area (not indicated with a reference symbol) of the occupant P is supported by the seat back 14, and a head area (not indicated with a reference symbol) of the occupant P is supported by the headrest 16. A front-and-rear direction, left-and-right direction (width direction) and vertical direction of the vehicle seat 10 match front-and-rear, left-and-right and vertical directions of a vehicle 11 (see FIG. 8 and FIG. 9) in which the vehicle seat 10 is mounted.

Figure 8:
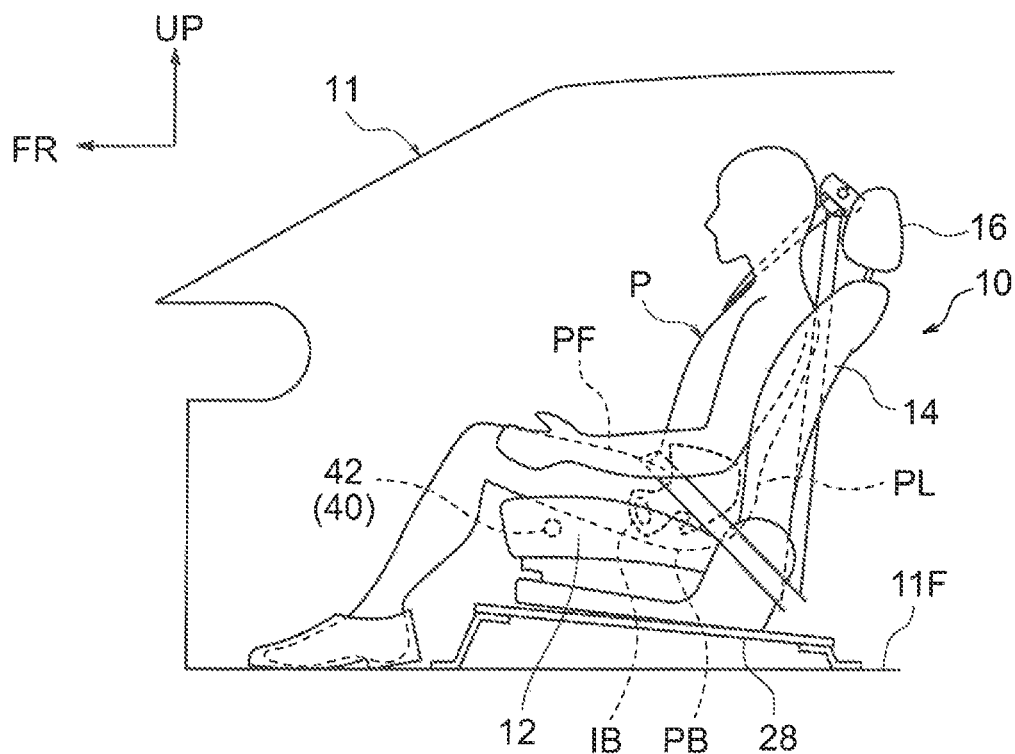
FIG. 8 is a schematic sectional diagram in which a passenger compartment front portion of a vehicle according to the first exemplary embodiment is seen from the left of the vehicle, showing a state before a front collision.
Figure 9:
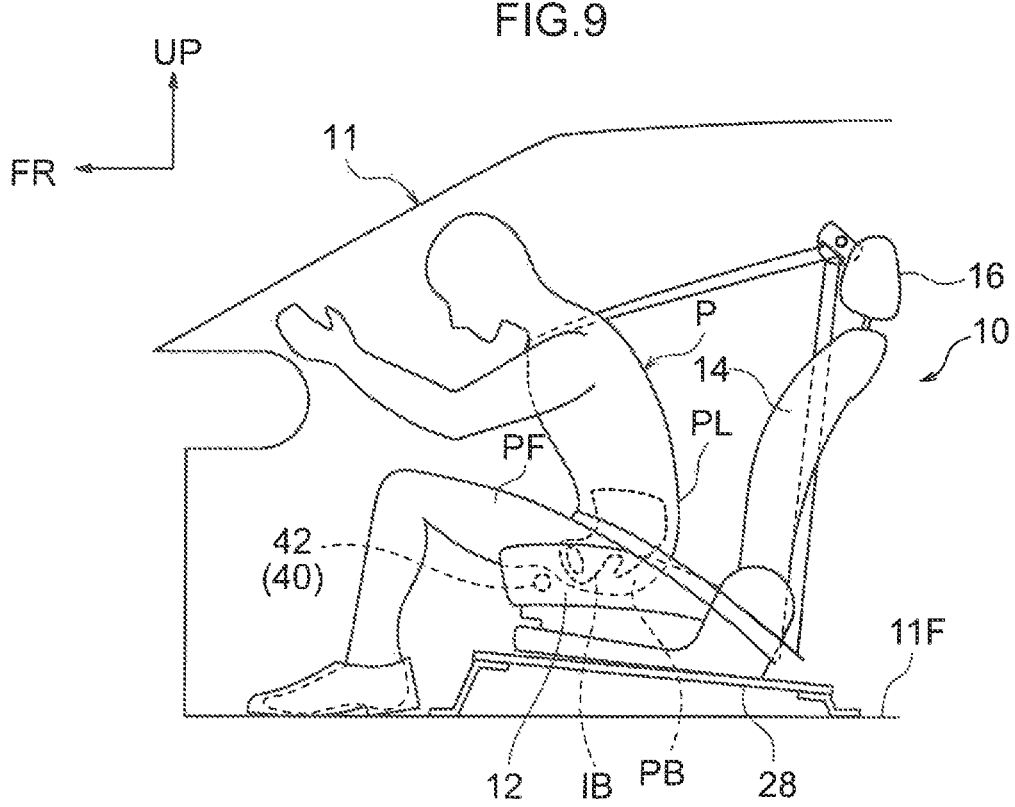
FIG. 9 is a sectional diagram corresponding to FIG. 8, showing a state during the front collision.
Figure 10:
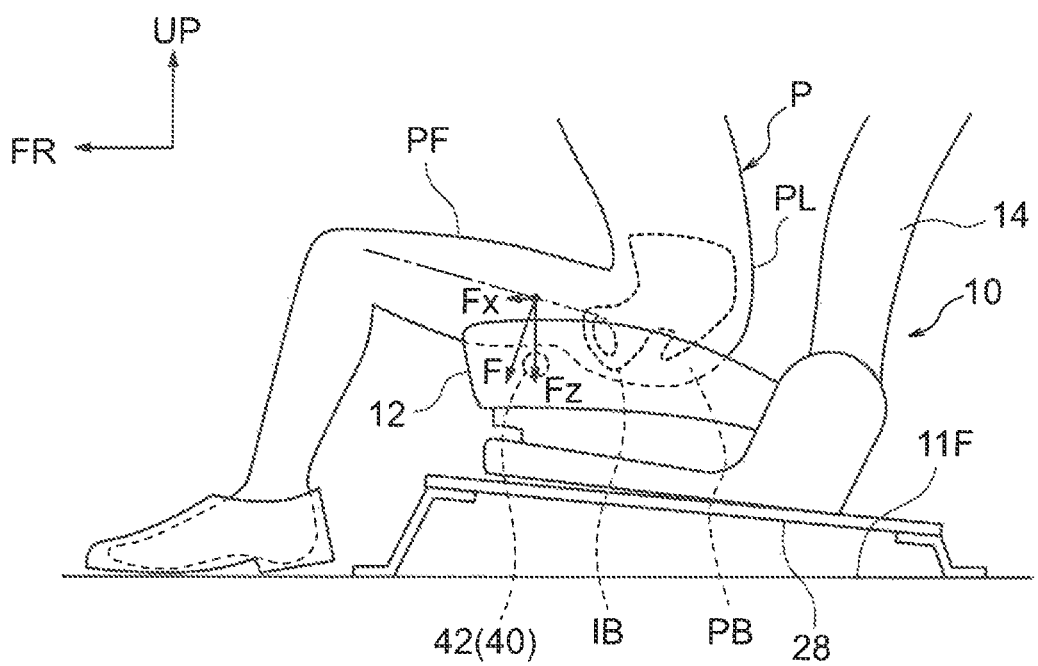
FIG. 10 is a magnified view showing a part of FIG. 9, which is a diagram for describing a load acting on a pelvis movement suppression member from the thigh area of the occupant in an initial period of the front collision.
Figure 11:
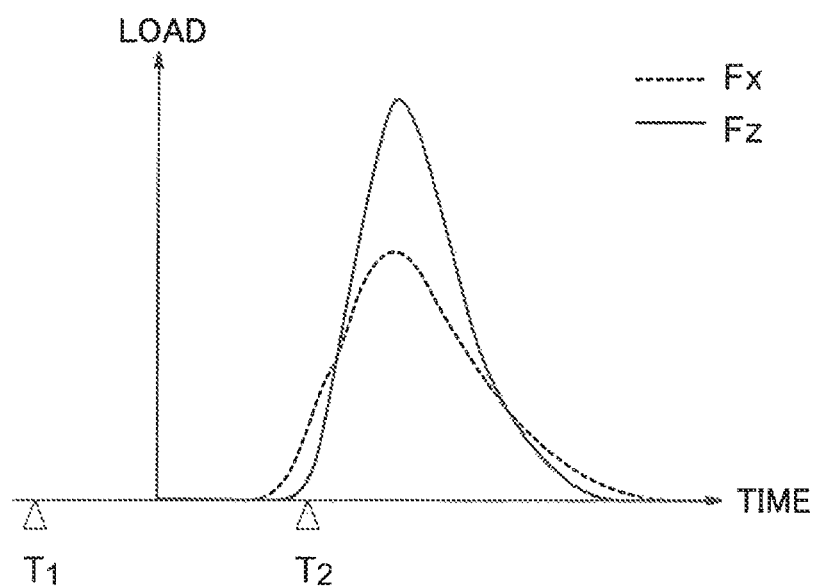
FIG. 11 is a graph showing relationships between a horizontal component and vertical component of the load illustrated in FIG. 10 and time before and after the front collision.
Figure 14:
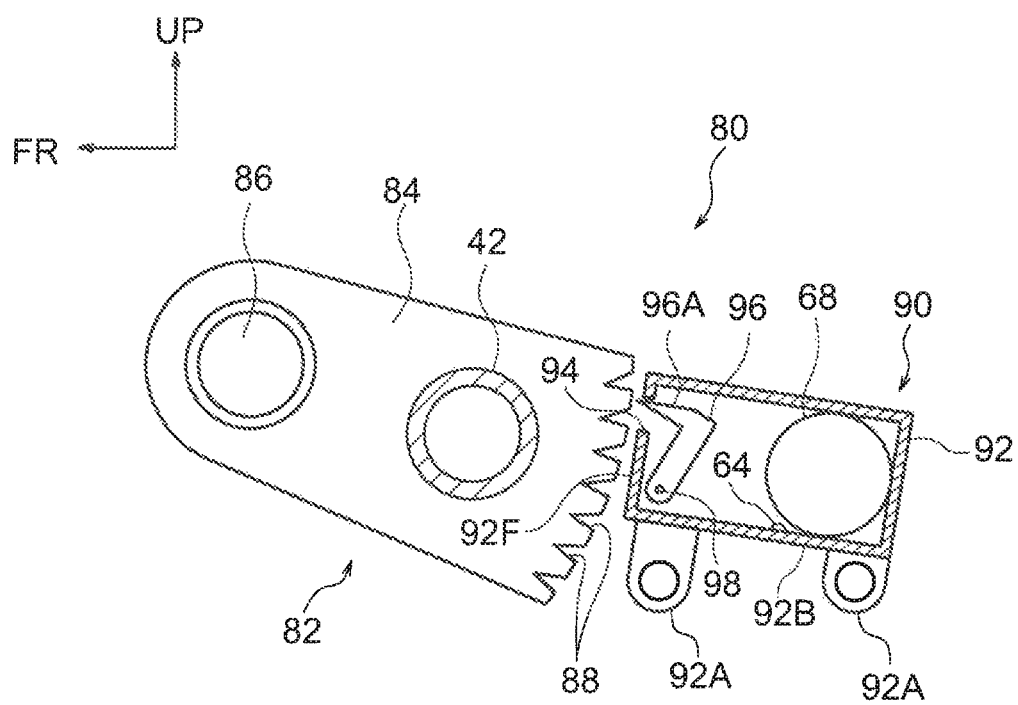
FIG. 14 is a partial sectional diagram corresponding to FIG. 13, showing a state in which an occupant is seated.

An occupant movement suppression apparatus 40 is provided inside a front portion of the seat cushion 12. The occupant movement suppression apparatus 40 is for suppressing forward movement of a pelvis area PL (the buttock area PB) of the occupant P during a front collision of the vehicle 11. In FIG. 8 to FIG. 10, the ischial bones of the occupant P are indicated with the reference symbol IB. Firstly, an outline of overall structure of the seat cushion 12 is described, and then structure of the occupant movement suppression apparatus 40 is described.

—The Seat Cushion—

The above-mentioned seat cushion 12 is provided with a seat cushion frame 18 that is a framework member, plural seat cushion springs 30 attached to the seat cushion frame 18, a seat cushion pad 32 that is supported by the seat cushion frame 18 and the seat cushion springs 30, and a seat cushion cover 34 that covers surfaces of the seat cushion pad 32.

The seat cushion frame 18 is provided with a left and right pair of side frames 20, a front frame 22, and an upper and lower pair of rear frames 24 and 26. The side frames 20 extend in the seat front-and-rear direction at left and right side portions of the seat cushion 12. The front frame 22 spans between upper portions at front sides of the left and right side frames 20. The rear frames 24 and 26 span between rear end portions of the left and right side frames 20.

The left and right side frames 20 are formed in long, narrow shapes of, for example, metal plate, and are arranged with the length directions thereof in the seat front-and-rear direction and thickness directions thereof in the seat width direction. The left and right side frames 20 are linked to a vehicle body floor portion 11F via a widely known seat sliding mechanism 28, which is shown in FIG. 8 to FIG. 10.

The front frame 22 is formed in a long, narrow shape of, for example, metal plate, and is arranged with the length direction thereof in the seat width direction. The front frame 22 is fixed to the front portions of the left and right side frames 20 by means such as welding or the like. The upper and lower rear frames 24 and 26 are formed of, for example, pipes fabricated of metal, and are arranged in attitudes in which axial directions thereof are in the seat width direction. Both vehicle width direction end portions of each of the upper and lower rear frames 24 and 26 are fixed to the rear end portions of the left and right side frames 20 by means such as crimping or the like.

The plural seat cushion springs 30 are "S springs", which are disposed to be arrayed in the seat width direction between the left and right side frames 20. The seat cushion springs 30 span between the front frame 22 and the lower side rear frame 26. The seat cushion pad 32 is formed of for example, a foam body of urethane foam or the like, and is attached to the seat cushion frame 18 from the upper side thereof. The seat cushion cover 34 is fabricated by, for example, sewing together plural cover pieces formed of cloth, leather, synthetic leather or the like. The seat cushion cover 34 covers the seat cushion pad 32 from the upper side thereof. The seat cushion cover 34 structures a top face (upper face) 12A of the seat cushion 12. Below, the top face 12A described above is referred to as "the seat cushion top face 12A".

A seat width direction central portion of the seat cushion 12 with the structure described above serves as a main body portion 12M, and two side portions in the seat width direction of the seat cushion 12 serve as a left and right pair of side support portions 12S. The main body portion 12M supports the buttock area PB and thigh area PF of the occupant P from the lower side. The left and right side support portions 12S bulge to a seat upper side relative to the main body portion 12M and form structures that support the buttock area PB and thigh area PF of the occupant P from the sides. In the present exemplary embodiment, references to the seat cushion top face 12A principally refer to the upper face of the main body portion 12M.

—The Occupant Movement Suppression Apparatus—

The occupant movement suppression apparatus 40 is provided with a pelvis movement suppression member 42, a vertical movement-enabling mechanism 46, and a left and right pair of stopper mechanisms 60. The pelvis movement suppression member 42 is disposed along the seat width direction inside a front portion of the seat cushion 12. The vertical movement-enabling mechanism 46 supports the pelvis movement suppression member 42 at the seat cushion frame 18, and allows the pelvis movement suppression member 42 to move vertically to follow vertical movements of the top face 12A of the seat cushion 12. The stopper mechanisms 60 are attached to the seat cushion frame 18, and restrict downward movement of the pelvis movement suppression member 42 when a rapid deceleration of the vehicle 11 is detected.

The pelvis movement suppression member 42 is formed in a completely straight shape of, for example, a pipe fabricated of metal and is disposed between the left and right side frames 20 in an attitude in which the length direction of the pelvis movement suppression member 42 is in the seat width direction. The pelvis movement suppression member 42 is disposed a little to a front side relative to a front-and-rear direction middle of the seat cushion 12, a little to the rear side relative to the front frame 22. The pelvis movement suppression member 42 is disposed to be separated to an upper side from the plural seat cushion springs 30.

An accommodation slot 36 (see FIG. 2) is formed in the seat cushion pad 32 in correspondence with the pelvis movement suppression member 42. The accommodation slot 36 opens to a lower side and extends in the seat width direction. The pelvis movement suppression member 42 is accommodated in the accommodation slot 36. Thus, the pelvis movement suppression member 42 is disposed at a vertical direction intermediate portion (in the vicinity of a vertical direction central portion) of the front portion of the seat cushion pad 32. An interposed portion 32A that is a portion of the seat cushion pad 32 is interposed between the pelvis movement suppression member 42 and the top face 12A of the seat cushion 12. At the interposed portion 32A, the vertical direction thickness of the seat cushion pad 32 is specified to be significantly reduced and the pelvis movement suppression member 42 is disposed in a vicinity below the seat cushion top face 12A. The material of the pelvis movement suppression member 42 is not limited to a material in a pipe shape and may be a material in a circular column shape. Further, the pelvis movement suppression member 42 may be embedded within the front portion of the seat cushion pad 32.

The vertical movement-enabling mechanism 46 includes a left and right pair of movable members 50 (the movable member 50 at the left side is not shown except in FIG. 1), and a left and right pair of support members 54 (the support member 54 at the left side is not shown except in FIG. 1). The movable members 50 are disposed at seat width direction outer sides of the pelvis movement suppression member 42, at seat width direction inner sides of the left and right side frames 20. The support members 54 support the left and right movable members 50 to be vertically slidable relative to the left and right side frames 20. The left and right movable members 50 and the left and right support members 54 have a similar structure, respectively, apart from being formed with left-right symmetry. Accordingly, descriptions below relate to the movable member 50 and support member 54 at the right side, which are shown in FIG. 1 and FIG. 3 to FIG. 7. Each of the left and right movable members 50 is below referred to simply as "the movable member 50", and each of the left and right support members 54 is below referred to simply as "the support member 54".

The movable member 50 is formed in a long, narrow, rectangular plate shape of, for example, metal plate and is disposed with the length direction thereof in the vertical direction and the plate thickness direction in the seat width direction. A seat width direction end portion of the pelvis movement suppression member 42 is fixed to an upper portion of the movable member 50 by means such as welding or the like. A plural number of vertically arrayed notches 52 are formed at a rear edge portion of a lower portion of the movable member 50. The notches 52 open towards the vehicle rear. Each notch 52 is formed substantially in a right-angled triangle shape in a seat width direction view, with an upper edge portion extending in the seat front-and-rear direction and a lower edge portion angled to slope downward toward the seat rear.

The support member 54 is formed of, for example, metal plate, and is formed in a flattened box shape of which an upper end portion is open and a seat width direction dimension is small. The support member 54 is fixed to a seat width direction inner side face of the side frame 20 by means such as welding, bolt-fastening or the like. The lower portion side of the movable member 50 is inserted inside the support member 54 from above. Thus, the movable member 50 is supported to be vertically movable (vertically slidable) relative to the support member 54. The support member 54 is a structure that is provided integrally with the seat cushion frame 18; that is, a portion of the seat cushion frame 18 serves as a support portion (a guide portion) that supports the movable member 50 to be vertically slidable.

A compression coil spring 56 that serves as an urging member is disposed between the lower end of the movable member 50 and a bottom wall 54B of the support member 54. The compression coil spring 56 urges the movable member 50 upward with a weak urging force. Consequently, the pelvis movement suppression member 42 is pressed against the interposed portion 32A of the seat cushion pad 32 by this urging force, and upward displacement of the pelvis movement suppression member 42 is limited by the interposed portion 32A. When no occupant P is seated on the vehicle seat 10, the pelvis movement suppression member 42 and the movable member 50 are disposed at the upper limit positions shown in FIG. 1, FIG. 3 and FIG. 4.

Figure 5:
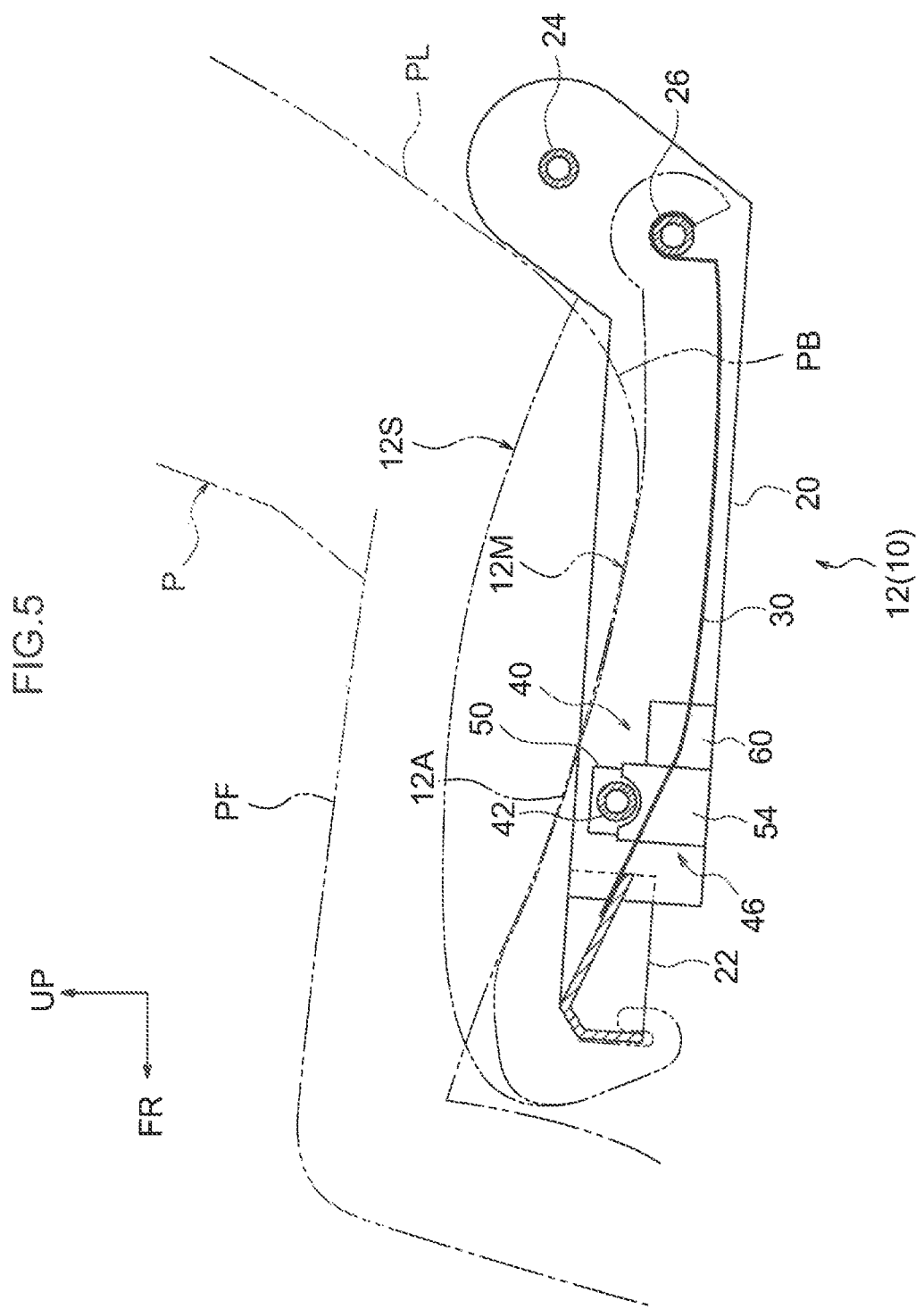
FIG. 5 is a sectional diagram corresponding to FIG. 4, showing a state in which an occupant is seated.
Figure 6:
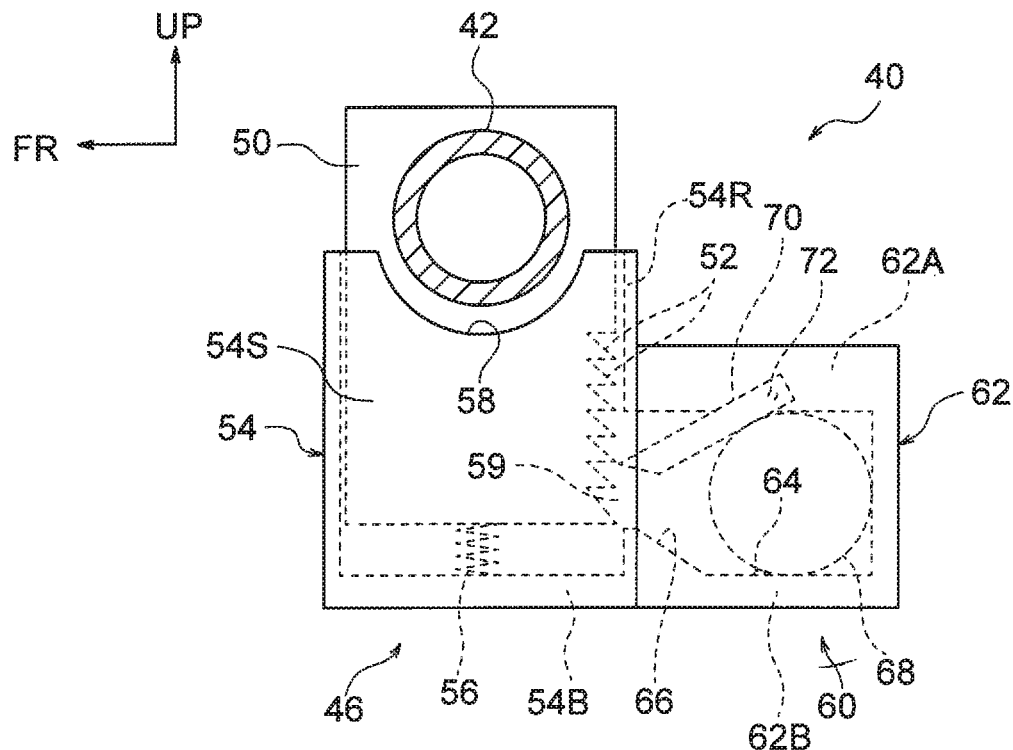
FIG. 6 is a side view corresponding to FIG. 3, showing the state in which the occupant is seated.

As shown in FIG. 5, when an occupant P sits on the vehicle seat 10, the top face 12A of the seat cushion 12 is moved downward by a load from the occupant P. As a result, the pelvis movement suppression member 42 and movable member 50 slide downward while resiliently deforming the compression coil spring 56 (see FIG. 6). Thus, the movable member 50 and pelvis movement suppression member 42 act as a structure that slides vertically following vertical movements of the seat cushion top face 12A in accordance with vibrations during vehicle running. That is, the vertical movement-enabling mechanism 46 according to the present exemplary embodiment is a structure that allows vertical movement of the pelvis movement suppression member 42 to follow vertical movement of the seat cushion top face 12A. If the pelvis movement suppression member 42 is embedded in the front portion of the seat cushion pad 32, the compression coil spring 56 (urging member) described above may be omitted. However, equipping the vertical movement-enabling mechanism 46 with the urging member that urges the movable member 50 (and the pelvis movement suppression member 42) upward facilitates the pelvis movement suppression member 42 following vertical movements of the seat cushion top face 12A.

A clearance portion (a cutaway portion) 58 that is cut away in a substantially semi-circular shape is formed in an upper end portion of a side wall 54S at a seat width direction inner side of the support member 54. Therefore, even in a state in which the movable member 50 is slid to a lower limit position at the lowest side relative to the support member 54 (not shown in the drawings), the pelvis movement suppression member 42 does not touch the side wall 54S of the support member 54. In other words, a range of support of the movable member 50 by the support member 54 is extended upward due to the clearance portion 58 being formed in the side wall 54S of the support member 54. An aperture portion 59 that opens to a seat rear side is formed in a lower side of a rear wall 54R of the support member 54. The aperture portion 59 opposes the stopper mechanism 60.

The stopper mechanisms 60 are disposed at the seat rear side relative to, respectively, the left and right support members 54. The left and right stopper mechanisms 60 have similar structures apart from being formed with left-right symmetry. Accordingly, descriptions below relate to the stopper mechanism 60 at the right side, which is shown in FIG. 1 and FIG. 3 to FIG. 7, and each of the left and right stopper mechanisms 60 is referred to simply as "the stopper mechanism 60". Note that a structure provided with the left and right stopper mechanisms 60 is not limiting. Structures are possible in which one of the left and right stopper mechanisms 60 is omitted, in which case the one of the left and right movable members 50 at the side at which the stopper mechanism 60 is omitted is structured without the plural notches 52.

The stopper mechanism 60 is provided with a case 62, a spherical body 68 that serves as a moving member, and a pawl member 70. The case 62 is formed of, for example, a metal, and is formed in a box shape of which the seat front side is open. The case 62 is disposed in a state in which a front end portion of the case 62 is in contact with a rear end portion of the support member 54. The case 62 is fixed to the side frame 20 by means such as welding, bolt-fastening or the like. The interior of the case 62 communicates with the interior of the support member 54 via the aperture portion 59 of the support member 54. Structures are possible in which the case 62 is fixed to the support member 54, and structures are possible in which the case 62 is formed integrally with the support member 54.

The spherical body 68 is formed of, for example, a metal, is accommodated inside the case 62, and is relatively movable in the seat front-and-rear direction with respect to the case 62. A protrusion (projection) 64 is formed at a front-and-rear direction central portion at an upper face of a bottom wall 62B of the case 62 (i.e., a floor face of the case 62). The protrusion 64 protrudes upward and extends in the seat width direction. At usual times, the spherical body 68 is disposed at a seat rear side relative to the protrusion 64. A height of the protrusion 64 is specified such that the spherical body 68 rides over the protrusion 64 and moves toward a seat front side when a decelerating rate during a rapid deceleration of the vehicle 11 is at least a pre-specified threshold (for example, at least 0.7 G). That is, in the present exemplary embodiment, the spherical body 68 moves toward the seat front side when the stopper mechanism 60 senses a rapid deceleration of the vehicle 11. The above-mentioned rapid deceleration occurs when the vehicle 11 rapidly brakes or the vehicle 11 has a front collision without braking. Note that the moving member provided at the stopper mechanism 60 is not limited to the spherical body 68 and may be, for example, a cylindrical member, as long as the moving member is moved toward the seat front side relative to the case 62 during a rapid deceleration of the vehicle 11.

An angled surface 66 that slopes upward toward the seat front side is formed at the floor face of the case 62 at a seat front side relative to the protrusion 64. The angled surface 66 functions as a stopper that limits the relative movement of the spherical body 68 toward the seat front side with respect to the case 62.

The pawl member 70 is formed in a long, narrow rectangular rod shape of, for example a metal, is accommodated inside the case 62, and is disposed at an upper side of the front side of the spherical body 68. One length direction end portion (a rear end portion) of the pawl member 70 is pivoted at an upper wall 62A of the case 62 by an axle 72 whose axial direction is in the seat width direction. Thus, the pawl member 70 is swingable vertically about the axle 72. At usual times, swinging of the pawl member 70 toward the lower side is limited by the pawl member 70 abutting against an upper face of the spherical body 68, and the pawl member 70 is disposed in an attitude that extends diagonally downward toward the seat front side. The length direction other end portion (front end portion) of the pawl member 70 tapers toward the seat front side and can fit into any one of the plural notches 52 formed in the movable member 50.

Figure 7:
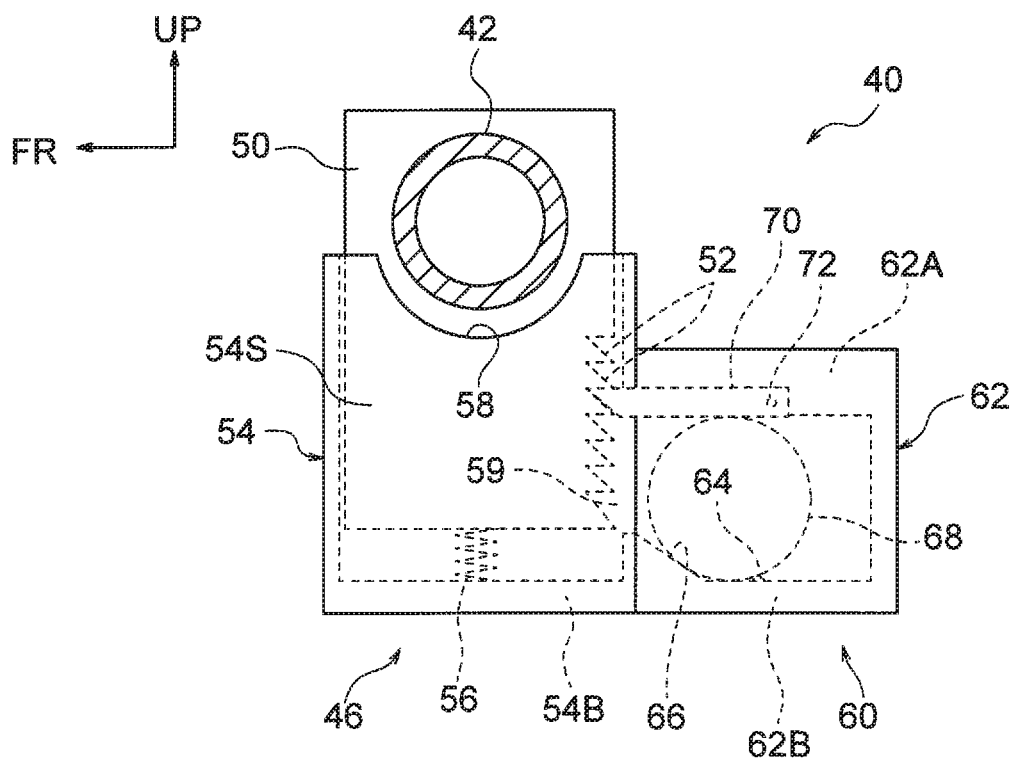
FIG. 7 is a side view corresponding to FIG. 3 and FIG. 6, showing an operated state of the stopper unit.

As shown in FIG. 7, when the spherical body 68 moves toward the seat front side relative to the case 62, the pawl member 70 is pushed by the spherical body 68 and swings upward. As a result, the front end portion of the pawl member 70 fits into (meshes with) one or other of the plural notches 52. In this meshed state, the pawl member 70 is in a substantially horizontal attitude, and the spherical body 68 is disposed between the pawl member 70 and the bottom wall 62B of the case 62. In addition, the protrusion 64 engages with the spherical body 68 from the seat rear side thereof. Therefore, the spherical body 68 is prevented from being unintendedly pushed back toward the seat rear side, and the meshed state described above is maintained. In this meshed state, a structure is formed in which downward movement of the movable member 50 relative to the support member 54, and thus downward movement of the pelvis movement suppression member 42 relative to the seat cushion frame 18, is restricted.

—Operation and Effects—

Now, operation and effects of the present exemplary embodiment are described.

In the vehicle seat 10 with the structure described above, the pelvis movement suppression member 42 is disposed along the seat width direction inside the front portion of the seat cushion 12 and is supported at the seat cushion frame 18 via the vertical movement-enabling mechanism 46. The vertical movement-enabling mechanism 46 allows vertical movements of the pelvis movement suppression member 42 following vertical movements of the seat cushion top face 12A. Therefore, when the seat cushion top face 12A moves vertically due to a load from an occupant P sitting on the seat cushion 12 and vibrations during vehicle running or the like, the pelvis movement suppression member 42 moves vertically together with the seat cushion top face 12A. Therefore, the occupant P is unlikely to sense the pelvis movement suppression member 42 as a foreign body, and sitting comfort at usual times may not be impaired.

More specifically, when an occupant P sits on the seat cushion 12 and the seat cushion top face 12A moves downward, the pelvis movement suppression member 42 moves downward together with the seat cushion top face 12A. The pelvis movement suppression member 42 is pressed by the compression coil spring 56 with a weak urging force against the interposed portion 32A that is a portion of the seat cushion pad 32. Thus, when the seat cushion top face 12A moves vertically due to vibrations during vehicle running, the pelvis movement suppression member 42 moves vertically together with the seat cushion top face 12A. Because the interposed portion 32A of the seat cushion pad 32 is interposed between the pelvis movement suppression member 42 and the seat cushion top face 12A, the occupant P is unlikely to sense the pelvis movement suppression member 42 as a foreign body.

When each stopper mechanism 60 attached to the seat cushion frame 18 senses a rapid deceleration of the vehicle 11, the stopper mechanism 60 restricts downward movement of the pelvis movement suppression member 42. Therefore, downward movement of the pelvis movement suppression member 42 may be restricted at a point in time before the pelvis area PL of the occupant P moves forward due to the rapid deceleration of the vehicle 11. Thus, downward movement of the pelvis movement suppression member 42 may be restricted at a vertical position that is virtually unaltered from a usual time. Consequently, when the pelvis area PL (ischial bones IB) of the occupant P approaches the pelvis movement suppression member 42 due to the rapid deceleration of the vehicle 11, the ischial bones IB may be restrained without the pelvis movement suppression member 42 being pushed down by the ischial bones IB. Therefore, forward movement of the pelvis area PL may be suppressed effectively.

A supplementary description of the effect described above is given using FIG. 8 to FIG. 11. As shown in FIG. 8, at a point in time before a front collision of the vehicle 11 (corresponding to time T1 in FIG. 11), the occupant P is in a usual sitting posture and the thigh area PF of the occupant P slopes at a shallow angle diagonally upward toward the vehicle front. As shown in FIG. 9, at a point in time at which the ischial bones IB of the occupant P are approaching the pelvis movement suppression member 42 due to the rapid deceleration of the vehicle 11 (corresponding to time T2 in FIG. 11), the pelvis movement suppression member 42 is pushed toward the lower side by the thigh area PF that is angled as described above. That is, at time T2 described above, as shown in FIG. 10, a force Fz with which the thigh area PF pushes the pelvis movement suppression member 42 toward the vehicle lower side is larger than a force Fx with which the thigh area PF pushes the pelvis movement suppression member 42 toward the vehicle front (see FIG. 11). The arrow F shown in FIG. 10 represents the resultant force of Fx and FZ.

In a structure among the technologies described in the Related Art section in which a forward movement of an occupant's buttock area at a time of rapid deceleration of a vehicle is utilized to press a stopper member from the seat rear, the force Fx at time T2 described above causes the stopper member to mesh with protrusions and indentations of a guide member. Therefore, the stopper member may be moved downward by the downward pushing force Fz before the stopper member meshes with the protrusions and indentations of the guide member. Similarly, in a structure among the technologies described in the Related Art section in which an inner pre-tensioner of a seatbelt is deployed to block downward movement of a stopper member, the stopper member may be moved downward by the downward pushing force Fz before a collision acceleration or the like is detected after a vehicle collision and the inner pre-tensioner is activated.

In the present exemplary embodiment, by contrast, the stopper mechanism 60 is operated by a deceleration of the vehicle at time T1 before the front collision occurs. Therefore, the ischial bones IB may be supported by the pelvis movement suppression member 42 at the height virtually unaltered from the usual sitting state. As a result, forward movement of the pelvis area PL may be suppressed effectively.

In the present exemplary embodiment, the pelvis movement suppression member 42 formed in the rod shape is disposed along the seat width direction inside the front portion of the seat cushion 12. Each seat width direction end portion of the pelvis movement suppression member 42 is fixed to the movable member 50 of the vertical movement-enabling mechanism 46. The movable member 50 is supported to be vertically slidable relative to the seat cushion frame 18. Therefore, during usual sitting, the movable member 50 slides vertically to follow vertical movements of the seat cushion top face 12A.

At each of the movable member 50 described above, the vertically arrayed plural notches 52 are formed. When the stopper mechanism 60 senses a rapid deceleration of the vehicle 11, the pawl member 70 of the stopper mechanism 60 meshes with one or other of the plural notches 52. As a result, downward movement of the pelvis movement suppression member 42 is restricted. Because the movable member 50 is a structure that is supported to be vertically slidable, a strength required to suppress forward movement of the pelvis area PL during a rapid deceleration of the vehicle may be assured more easily than in a structure in which the movable member 50 is supported to be vertically rotatable (swingable). Furthermore, space for arrangement of the vertical movement-enabling mechanism 46 inside the seat cushion 12 may be more easily reserved than in, as mentioned above, a structure in which the movable member 50 is rotatably supported.

In the present exemplary embodiment, when the vehicle 11 rapidly decelerates, the spherical body 68 of the stopper mechanism 60 rides over the protrusion 64 due to the action of the deceleration, moves toward the seat front side, and pushes the pawl member 70. As a result, the pawl member 70 meshes with one of the plural notches 52 of the movable member 50. Therefore, downward movement of the pelvis movement suppression member 42 may be restricted by a simple structure. Furthermore, this is not limited to a situation in which the vehicle 11 brakes and rapidly decelerates. In a situation in which the vehicle 11 has a front collision without braking, the spherical body 68 is moved toward the seat front side by the rapid deceleration caused by the front collision. A threshold for the deceleration at which the spherical body 68 is to move toward the seat front side is set to around, for example, 0.7 G. Thus, downward displacement of the pelvis movement suppression member 42 may be suppressed immediately after a front collision occurs.

A second exemplary embodiment of the present invention is described. Structures and operations that are basically the same as in the first exemplary embodiment are assigned the same reference symbols as in the first exemplary embodiment and are not described.

Second Exemplary Embodiment

FIG. 12 is a perspective view showing neighboring structures including a portion of an occupant movement suppression apparatus 80 provided at a vehicle seat according to the second exemplary embodiment of the present invention. FIG. 13 is a partial sectional diagram in which a portion of the structure illustrated in FIG. 12 is seen from the left of the vehicle. The vehicle seat according to this exemplary embodiment is equipped with the occupant movement suppression apparatus 80, which differs from the occupant movement suppression apparatus 40 according to the first exemplary embodiment; other structures are the same as in the first exemplary embodiment.

The occupant movement suppression apparatus 80 according to this exemplary embodiment is provided with the pelvis movement suppression member 42, a vertical movement-enabling mechanism 82, and a left and right pair of stopper mechanisms 90 (only the stopper mechanism 90 at the left side is shown in the drawings). The pelvis movement suppression member 42 has a similar structure to the pelvis movement suppression member 42 according to the first exemplary embodiment. The vertical movement-enabling mechanism 82 supports the pelvis movement suppression member 42 at the seat cushion frame 18 and allows the pelvis movement suppression member 42 to move vertically to follow vertical movements of the top face 12A of the seat cushion 12. Each stopper mechanism 90 is attached to the seat cushion frame 18. When a rapid deceleration of the vehicle 11 is detected, the stopper mechanism 90 restricts downward movement of the pelvis movement suppression member 42.

The vertical movement-enabling mechanism 82 includes a left and right pair of movable members 84 (the movable member 84 at the left side is not shown in the drawings) and a left and right pair of axles 86 (the axle 86 at the left side is not shown in the drawings). The movable members 84 are disposed at seat width direction outer sides of the pelvis movement suppression member 42, at seat width direction inner sides of the left and right side frames 20 (the side frame 20 at the left side is not shown in the drawings). The axles 86 support the movable members 84 to be rotatable relative to the left and right side frames 20, about axes in the seat width direction. The left and right movable members 84 and the left and right axles 86 have similar structures apart from being formed with left-right symmetry. Accordingly, descriptions below relate to the movable member 84 and axle 86 at the right side, which are shown in FIG. 12 to FIG. 15. Each of the left and right movable members 84 is referred to simply as "the movable member 84", and each of the left and right axles 86 is referred to simply as "the axle 86".

The movable member 84 is formed in an elongated plate shape of, for example, metal plate, and is disposed at the seat width direction inner side of the side frame 20 in an attitude in which the length direction of the movable member 84 is in the seat front-and-rear direction and the plate thickness direction is in the seat width direction. One length direction end portion (a front end portion) of the movable member 84 is supported at the side frame 20 via the axle 86. The axle 86 is disposed with the axial direction thereof in the seat width direction.

A seat width direction end portion of the pelvis movement suppression member 42 is fixed to a rear portion of the movable member 84 at a seat rear side of the axle 86 (one side in the seat front-and-rear direction), by means such as welding or the like. Thus, the pelvis movement suppression member 42 is made vertically rotatable about the axle 86 (about the axis in the seat width direction) together with the movable member 84. A rear end portion of the movable member 84 is formed in a circular arc shape centered on the rotation center of the movable member 84. Thus, the movable member 84 is formed substantially in a handfan shape in a seat width direction view. Plural notches 88 that are formed in substantially triangular shapes in the seat width direction view are formed in a rear end portion of the movable member 84, arrayed in the rotation direction of the movable member 84 (substantially in the vertical direction). These notches 88 are specified within a range corresponding to an angle θ1 through which the movable member 84 rotates in a range in which the pelvis movement suppression member 42 moves vertically together with the seat cushion top face 12A.

An urging member that is not shown in the drawings (for example, a torsion spring) is provided between the movable member 84 and axle 86 described above. The urging member urges the movable member 84 upward with a weak urging force and presses the pelvis movement suppression member 42 against the interposed portion 32A of the seat cushion pad 32 (see FIG. 2). This urging member may be omitted in a structure in which the pelvis movement suppression member 42 is embedded in the front portion of the seat cushion pad 32.

The left and right stopper mechanisms 90 (the stopper mechanism 90 at the left side is not shown in the drawings) are disposed at a seat rear side relative to, respectively, the left and right movable members 84. The left and right stopper mechanisms 90 have similar structures apart from being formed with left-right symmetry. Below, each of the left and right stopper mechanisms 90 is referred to simply as "the stopper mechanism 90". Note that a structure provided with the left and right stopper mechanisms 90 is not limiting. Structures are possible in which one of the left and right stopper mechanisms 90 is omitted, in which case the one of the left and right movable members 84 at the side at which the stopper mechanism 90 is omitted is structured without the plural notches 88.

The stopper mechanism 90 is provided with a case 92, the spherical body 68 serving as the moving member, and a pawl member 96 that serves as a pawl member. The case 92 is formed of, for example, a metal, and is formed in a box shape that is long with a length thereof in the seat front-and-rear direction. The case 92 is disposed in an attitude with a small elevation angle θ2 toward the vertical movement-enabling mechanism 82, that is, an attitude that is angled slightly upward to the front relative to the vehicle front-and-rear direction. The case 92 includes a front-and-rear pair of fixing pieces 92A that extend toward a lower side. The fixing pieces 92A are fixed to the side frame 20 by means of such as bolt-fastening or the like. An aperture portion 94 is formed at an upper portion of a front wall 92F of the case 92, at a position opposing a rear end portion of the movable member 84.

The spherical body 68 is accommodated inside the case 92 and is relatively movable in the seat front-and-rear direction with respect to the case 92. A protrusion 64 is formed at an upper face of a bottom wall 92B of the case 92 (i.e., a floor face of the case 92), similarly to the protrusion 64 according to the first exemplary embodiment. At usual times, the spherical body 68 is disposed at a seat rear side relative to the protrusion 64. The spherical body 68 rides over the protrusion 64 and moves toward a seat front side when a deceleration during a rapid deceleration of the vehicle 11 is at least a pre-specified threshold (for example, at least 0.7 G). This threshold may be adjusted by altering the aforementioned elevation angle θ2 and a protrusion height of the protrusion 64.

A pawl member 96 is formed in an elongated rectangular rod shape of, for example, a metal and is accommodated inside the case 92. One length direction end portion (a lower end portion) of the pawl member 96 is pivoted at a side wall (not indicated with a reference symbol) of the case 92 by an axle 98 whose axial direction is in the seat width direction. Accordingly, the pawl member 96 is swingable to front and rear about the axle 98, between a rear tilted position shown in FIG. 13 and FIG. 14 and an advanced position shown in FIG. 15. At usual times, the pawl member 96 is disposed at the rear tilted position. At another length direction end portion (the upper end portion) of the pawl member 96, a pawl 96A is formed projecting toward the seat front side. The pawl 96A tapers toward the seat front side. The distal end of the pawl 96A is inserted into the aforementioned aperture portion 94.

Figure 15:
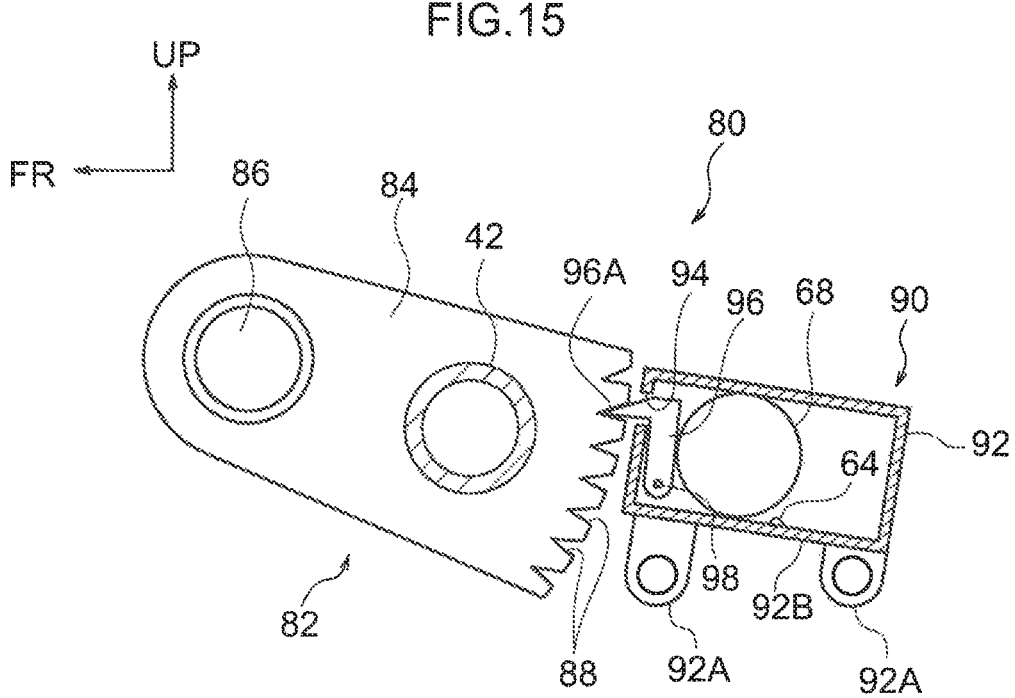
FIG. 15 is a partial sectional diagram corresponding to FIG. 13 and FIG. 14, showing an operated state of a stopper unit.

As shown in FIG. 15, when the spherical body 68 is moved toward the seat front relative to the case 92, the pawl member 96 is pushed by the spherical body 68 and swings forward (toward the advanced position). As a result, the pawl 96A of the pawl member 96 fits into (meshes with) one or other of the plural notches 88. In this meshed state, because the protrusion 64 engages with the spherical body 68 from the seat rear side thereof, the spherical body 68 is prevented from being unintendedly pushed back toward the seat rear side, and the meshed state described above is maintained. In this meshed state, a structure is formed in which downward movement of the movable member 84 relative to the side frame 20, and thus downward movement of the pelvis movement suppression member 42 relative to the seat cushion frame 18, is restricted.

In this exemplary embodiment too, during usual sitting, the pelvis movement suppression member 42 rotates vertically about the axle 86 to follow vertical movements of the seat cushion top face 12A together with the movable member 84. Thus, sitting comfort at usual times is not impaired. Further, when each stopper mechanism 90 senses a rapid deceleration of the vehicle 11, the stopper mechanism 90 restricts downward movement of the pelvis movement suppression member 42. As a result, forward movement of the pelvis area PL may be suppressed effectively. In addition, in this exemplary embodiment, because the pelvis movement suppression member 42 is moved vertically by rotation of the movable member 84, resistance to the movable member 84 during rotation (during movement) may be smaller than in a structure as in the first exemplary embodiment in which the movable member 50 slides vertically. Thus, the pelvis movement suppression member 42 may be moved vertically more smoothly. Therefore, a sensation for the occupant of the pelvis movement suppression member 42 as a foreign body may be further reduced.

In the movable member 84 according to this exemplary embodiment, the seat width direction end portion of the pelvis movement suppression member 42 is fixed at the seat rear side relative to the rotation center of the movable member 84, and the plural notches 88 are formed in the rear end portion of the movable member 84. However, the present invention is not limited thus. The seat width direction end portion of the pelvis movement suppression member may be fixed at a front side relative to the rotation center of the movable member and the plural notches may be formed in a front end portion of the movable member, in which case an actuator that serves as the stopper mechanism is disposed at a seat front side of the movable member.

Third Exemplary Embodiment

Figure 16:
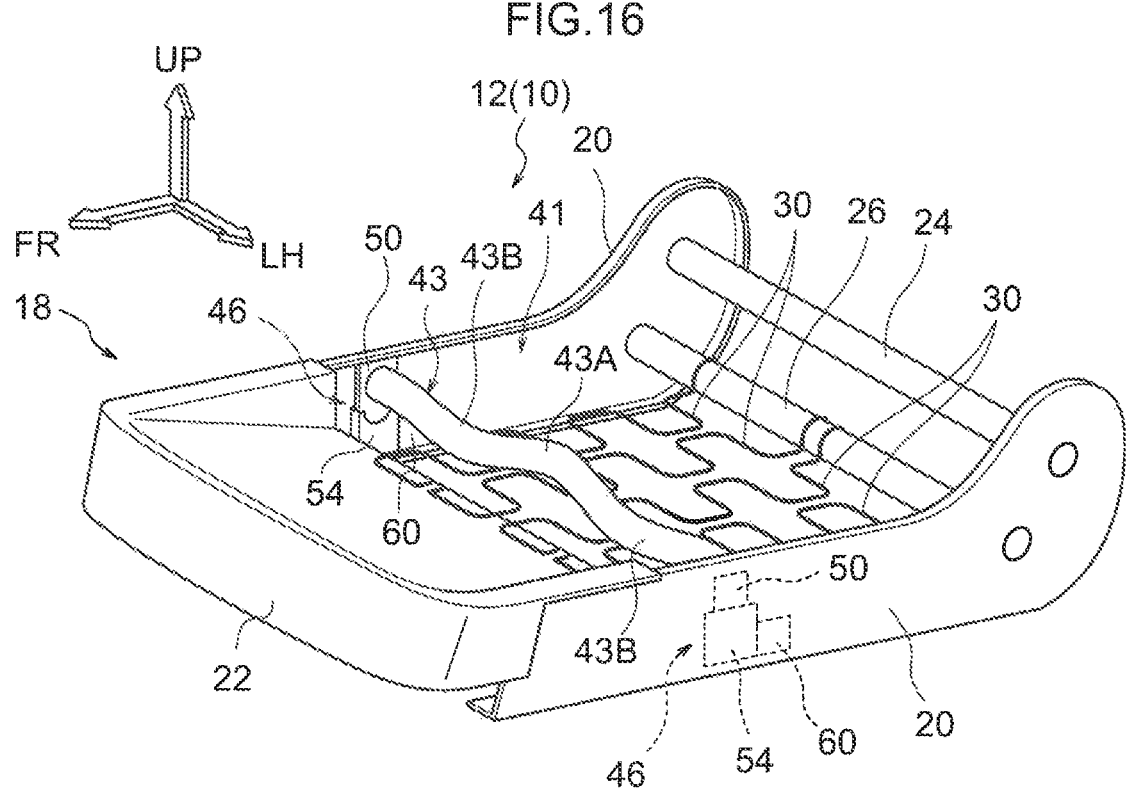
FIG. 16 is a perspective diagram showing a seat cushion frame and occupant movement suppression apparatus provided at a vehicle seat according to a third exemplary embodiment of the present invention.

FIG. 16 is a perspective diagram showing the seat cushion frame 18 and an occupant movement suppression apparatus 41 provided at a vehicle seat according to a third exemplary embodiment of the present invention. The vehicle seat according to this exemplary embodiment is equipped with the occupant movement suppression apparatus 41, which has a basically similar structure to the occupant movement suppression apparatus 40 according to the first exemplary embodiment. However, the structure of a pelvis movement suppression member 43 of the occupant movement suppression apparatus 41 differs from the pelvis movement suppression member 42 according to the first exemplary embodiment. Other structures are the same as in the first exemplary embodiment.

Figure 17:
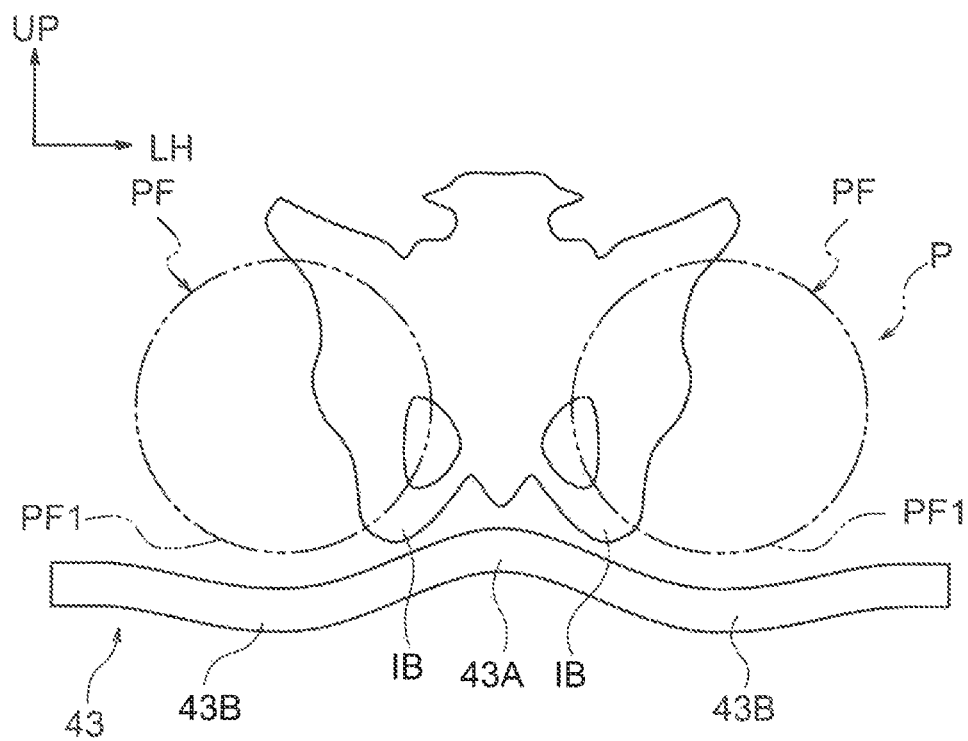
FIG. 17 is a schematic diagram showing positional relationships between a pelvis movement suppression member according to the third exemplary embodiment and the pelvis area and thigh areas of an occupant.

The pelvis movement suppression member 43 according to this exemplary embodiment has a basically similar structure to the pelvis movement suppression member 42 according to the first exemplary embodiment. However, the pelvis movement suppression member 43 is formed substantially in a "W" shape in a seat front-and-rear direction view, in which a seat width direction central portion of the pelvis movement suppression member 43 is inflected upward to form a protrusion and portions at both seat width direction sides are inflected to form recesses downward. To be specific, as shown in FIG. 17, the seat width direction central portion of the pelvis movement suppression member 43, which is to be disposed at the seat front side relative to the ischial bones IB of the occupant P, is formed as an upward protrusion portion 43A that is formed to protrude toward a seat upper side and curved in a circular arc shape. The portions at both seat width direction sides, which are to be disposed below the left and right thigh areas PF of the occupant P, are formed as a left and right pair of downward protrusion portions 43B that are formed to protrude downward and curved in circular arc shapes.

Figure 18:
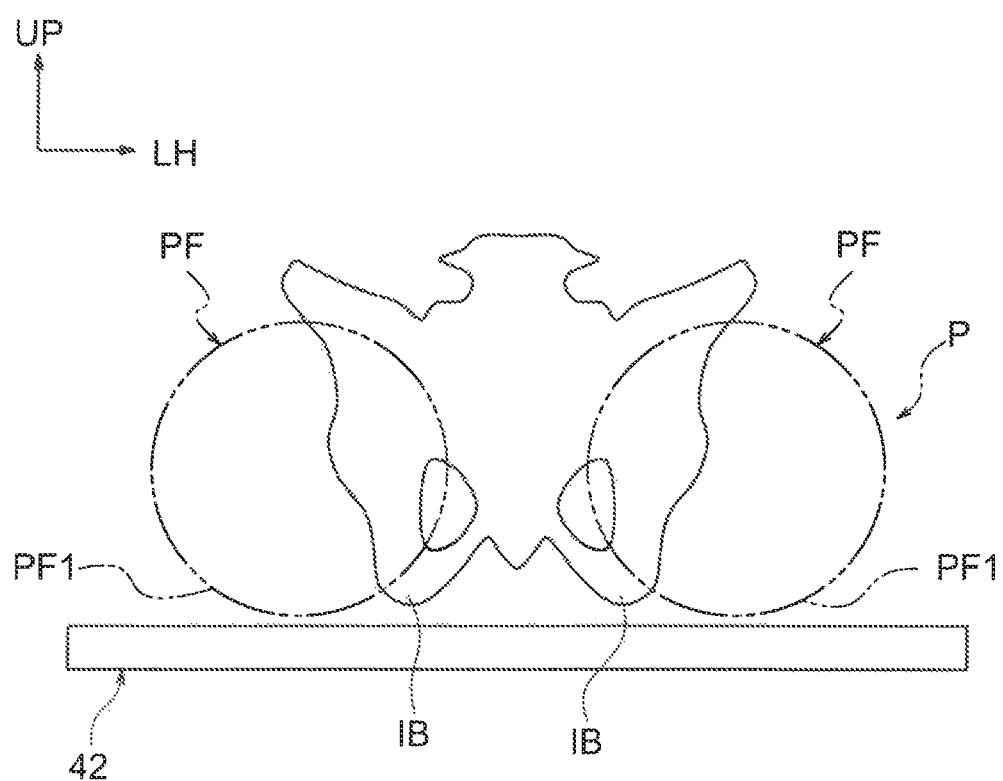
FIG. 18 is a schematic diagram corresponding to FIG. 17, showing positional relationships between the pelvis movement suppression member according to the first exemplary embodiment and the pelvis area and thigh areas of an occupant.

In this exemplary embodiment, as described above, the portions of the pelvis movement suppression member 43 at the sides in the seat width direction are curved to form recesses downward. As a result, spaces between the portions at the two seat width direction sides of the pelvis movement suppression member 43 and the left and right thigh areas PF of the occupant P may be assuredly larger than in a structure in which the pelvis movement suppression member 42 is formed in a completely straight rod shape as in the first exemplary embodiment (see FIG. 18). Moreover, distances between lower faces PFI (curved faces) of the left and right thigh areas PF and the pelvis movement suppression member 43 are constant along the seat width direction than in the first exemplary embodiment. That is, the pelvis movement suppression member 42 according to the first exemplary embodiment interferes with the left and right thigh areas PF at points (making point contact via portions of the seat cushion pad 32 and the seat cushion cover 34 and the same hereinafter). In contrast, the pelvis movement suppression member 43 according to the present exemplary embodiment interferes with the left and right thigh areas PF in linear shapes along the lower faces PFI. Consequently, a sensation for the occupant of the pelvis movement suppression member 43 as a foreign body is further reduced. In addition, because the seat width direction central portion of the pelvis movement suppression member 43 is inflected to form a protrusion upward, a range of interference between the ischial bones IB of the occupant P and the pelvis movement suppression member 43 during a rapid deceleration of the vehicle 11 is widened. As a result, forward movement of the pelvis area PL of the occupant P may be even more effectively suppressed.

Fourth Exemplary Embodiment

Figure 19:
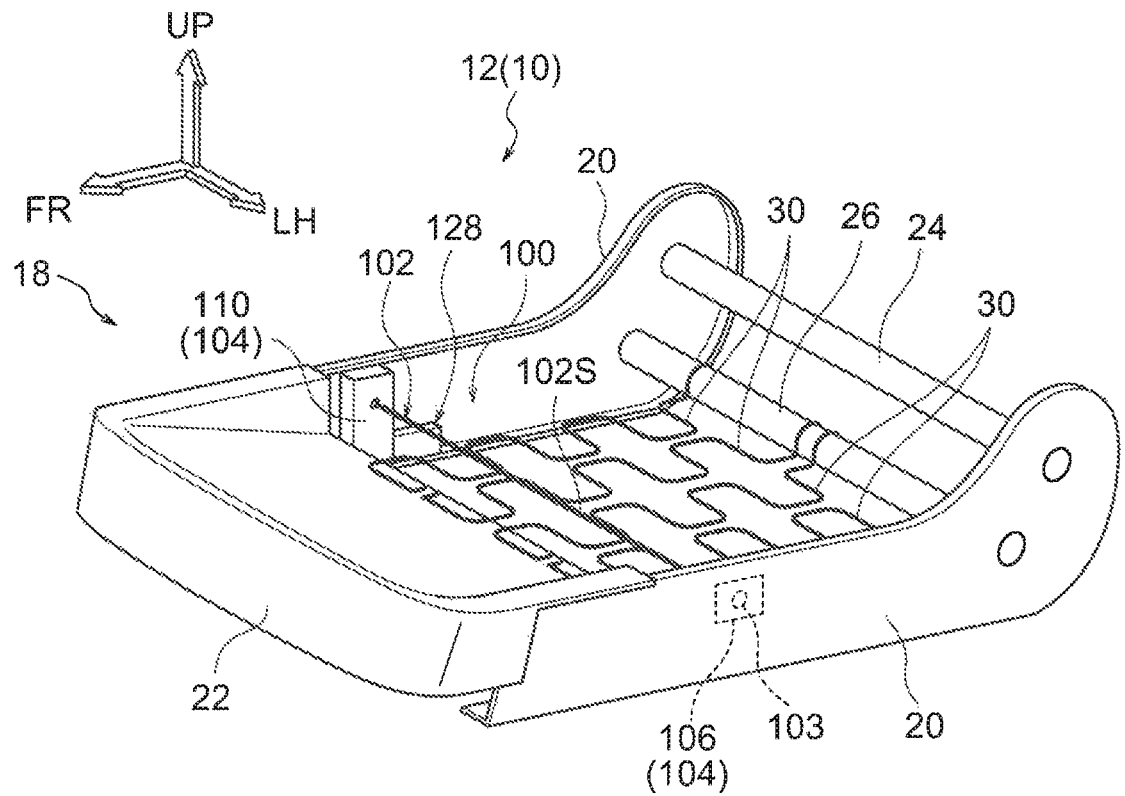
FIG. 19 is a perspective diagram showing a seat cushion frame and occupant movement suppression apparatus provided at a vehicle seat according to a fourth exemplary embodiment of the present invention.

FIG. 19 is a perspective diagram showing the seat cushion frame 18 and an occupant movement suppression apparatus 100 provided at a vehicle seat according to a fourth exemplary embodiment of the present invention. The vehicle seat according to this exemplary embodiment is equipped with the occupant movement suppression apparatus 100, which differs from the occupant movement suppression apparatus 40 according to the first exemplary embodiment; other structures are the same as in the first exemplary embodiment.

The occupant movement suppression apparatus 100 according to the present exemplary embodiment is provided with a wire (a linear member) 102 that serves as the pelvis movement suppression member, a vertical movement-enabling mechanism 104, and an actuator 128 that serves as the stopper mechanism. The wire 102 is disposed along the seat width direction inside the front portion of the seat cushion 12. The vertical movement-enabling mechanism 104 supports the wire 102 at the seat cushion frame 18 and allows the wire 102 to move vertically to follow vertical movements of the top face 12A of the seat cushion 12. The actuator 128 is attached to the seat cushion frame 18. When a collision prediction sensor, which is not shown in the drawings, predicts a collision of the vehicle 11, the actuator 128 restricts downward movement of the wire 102.

The wire 102 is formed in a linear shape of a material with high pliability and tensile rigidity, and features flexibility. The wire 102 is embedded inside the front portion of the seat cushion pad 32.

The vertical movement-enabling mechanism 104 includes an anchoring portion 106, a movable member 122, a support member 110, a pulley 114, and a compression coil spring 126 that serves as an urging member. The anchoring portion 106 anchors one end portion (in this exemplary embodiment, a left end portion) of the wire 102 at one end portion in the seat width direction of the seat cushion frame 18 (in this exemplary embodiment, the side frame 20 at the left side). Another end portion (in this exemplary embodiment, a right end portion) of the wire 102 is anchored at the movable member 122. The support member 110 is fixed to another end portion in the seat width direction of the seat cushion frame 18 (in this exemplary embodiment, the side frame 20 at the right side) and slidably supports the movable member 122. The other end side of the wire 102 is wound round the pulley 114. The compression coil spring 126 urges the movable member 122 toward a lower side.

Figure 20:
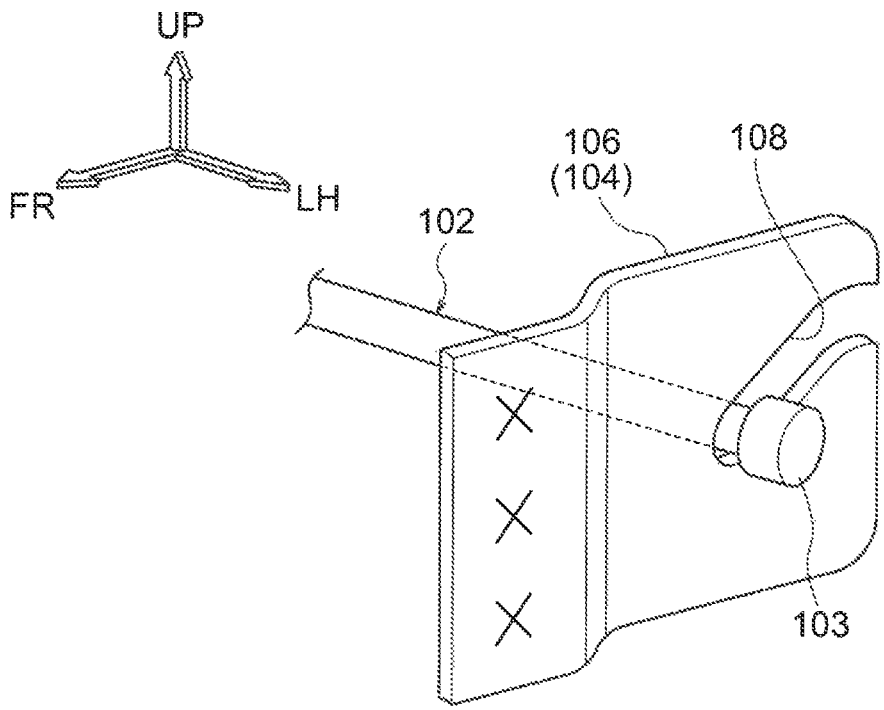
FIG. 20 is a perspective diagram showing structures neighboring an anchoring portion of a vertical movement-enabling unit of the occupant movement suppression apparatus according to the fourth exemplary embodiment.

As shown in FIG. 20, the anchoring portion 106 is a clasp formed in a substantially elongated rectangular plate shape of, for example, metal plate. The anchoring portion 106 is disposed at a seat width direction inner side of the side frame 20 at the left side in an attitude in which the length direction of the anchoring portion 106 is in the seat front-and-rear direction and the plate thickness direction is in the seat width direction. The anchoring portion 106 is inflected substantially in a crank shape in a vertical direction view. A front portion of the anchoring portion 106 is fixed to the seat width direction inner side face of the side frame 20 at the left side by means such as welding or the like. A rear portion of the anchoring portion 106 is disposed to be separated from the side frame 20.

A slit 108 is formed in a rear portion of the anchoring portion 106. The slit 108 is cut toward a seat front side and seat lower side from the rear end of the anchoring portion 106. A nipple 103 that is provided at one end portion of the wire 102 is inserted into the slit 108. Thus, the one end portion of the wire 102 is anchored at the side frame 20 at the left side via the anchoring portion 106. A structure is also possible in which an anchoring portion that anchors the one end portion of the wire 102 is formed at one end portion in the seat width direction of the seat cushion frame 18 (i.e., a structure in which a portion of the seat cushion frame serves as the anchoring portion).

As shown in FIG. 21 to FIG. 25, the support member 110 is formed in a long box shape. The support member 110 is disposed at the seat width direction inner side of the side frame 20 at the right side in an attitude in which the length direction of the support member 110 is in the seat vertical direction. The support member 110 is fixed to the side frame 20 at the right side by means such as bolt-fastening or the like. A wire insertion hole 112 is formed at an upper end portion of a side wall 110S at a seat width direction inner side of the support member 110. The other end side of the wire 102 is passed through the wire insertion hole 112 and inserted inside the support member 110.

The pulley 114 is accommodated at an upper portion of the interior of the support member 110. The pulley 114 is arranged with an axial direction thereof in the seat front-and-rear direction and is supported to be rotatable relative to the support member 110. The other end side of the wire 102 is wound round the pulley 114 from an upper side thereof and curves toward a lower side of the interior of the support member 110. A check plate 116 is formed integrally with the support member 110 in order to prevent the other end side of the wire 102 disengaging from the pulley 114.

A movable member accommodation chamber 118 is formed by partition at a lower side of the interior of the support member 110. The movable member accommodation chamber 118 is formed in a cylindrical shape whose axial direction is in the seat vertical direction. A penetrating hole 120 is formed at an upper wall (not indicated with a reference symbol) of the movable member accommodation chamber 118. The other end side of the wire 102 is inserted inside the movable member accommodation chamber 118 through the penetrating hole 120. The movable member 122 is accommodated inside the movable member accommodation chamber 118.

The movable member 122 is formed in a long, substantially cylindrical shape. The movable member 122 is in an attitude in which the axial direction of the movable member 122 is in the seat vertical direction. The movable member 122 is supported to be vertically slidable by the movable member accommodation chamber 118, and thus by the support member 110. The other end portion of the wire 102 is anchored at one length direction end portion (an upper end portion) of the movable member 122 by means such as welding, crimping or the like. The compression coil spring 126 is disposed between the movable member 122 and an upper wall of the movable member accommodation chamber 118. The compression coil spring 126 urges the movable member 122 toward the lower side. Thus, at usual times, the movable member 122 is disposed at the lower limit position shown in FIG. 21 and FIG. 22. Plural notches 124 are formed at the movable member 122, arrayed in the length direction thereof. The notches 124 are grooves that extend in annular shapes in a circumferential direction of the movable member 122. The notches 124 correspond with an actuator 128, which is described below.

Figure 21:
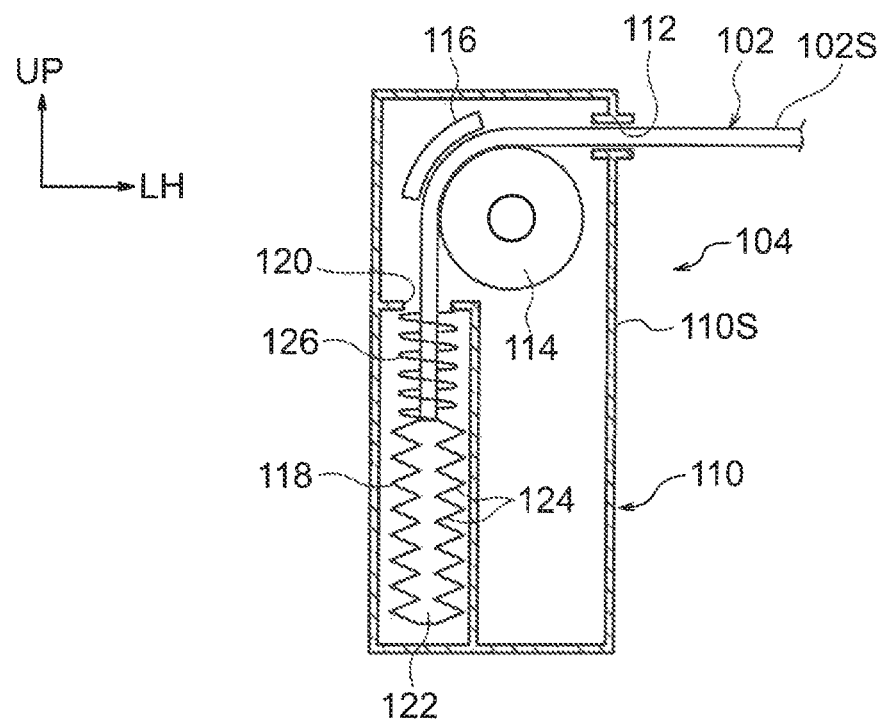
FIG. 21 is a sectional diagram showing neighboring structures including a movable member and a support member of the vertical movement-enabling unit of the occupant movement suppression apparatus according to the fourth exemplary embodiment.
Figure 22:
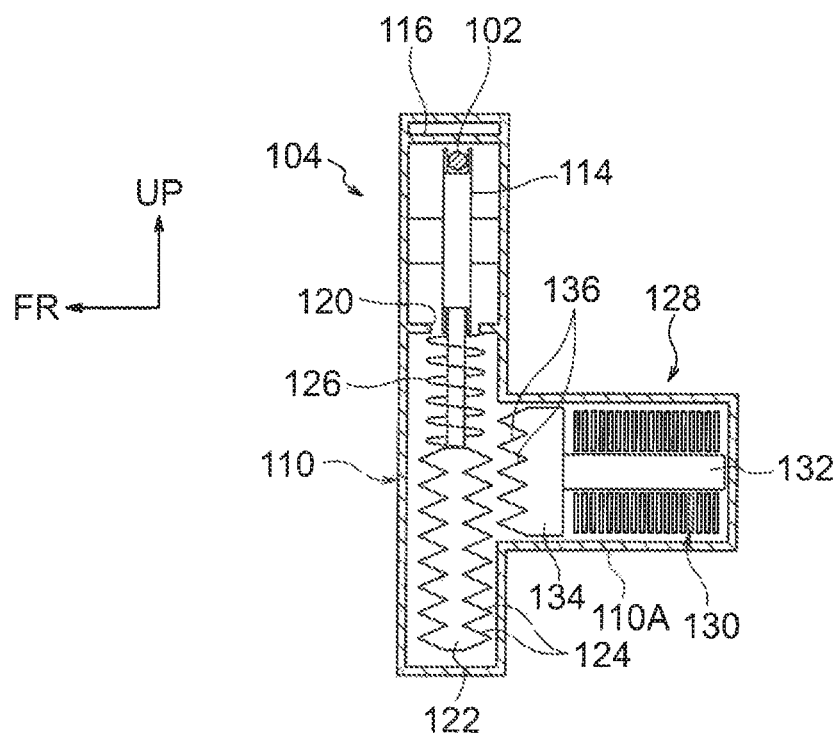
FIG. 22 is a sectional diagram showing the vertical movement-enabling unit and a stopper unit of the occupant movement suppression apparatus according to the fourth exemplary embodiment.
Figure 23:
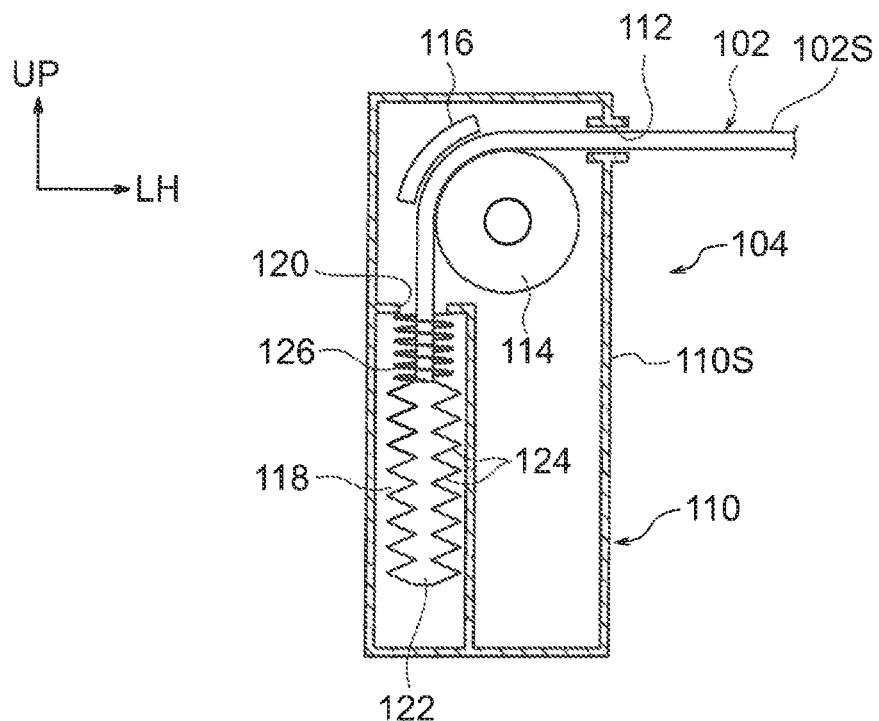
FIG. 23 is a sectional diagram corresponding to FIG. 21, showing a state in which an occupant is seated on the vehicle seat according to the fourth exemplary embodiment.
Figure 24:
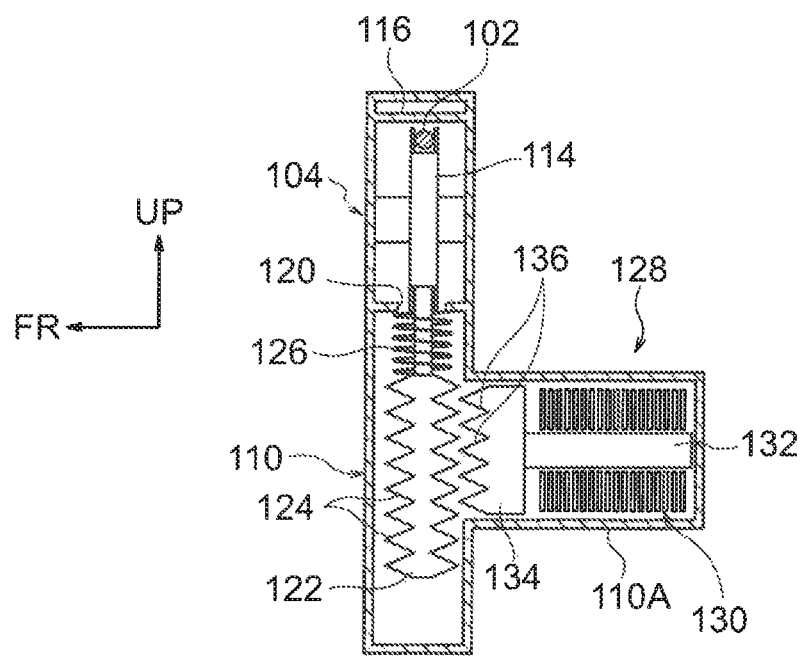
FIG. 24 is a sectional diagram corresponding to FIG. 22, showing the state in which the occupant is seated on the vehicle seat according to the fourth exemplary embodiment.
Figure 25:
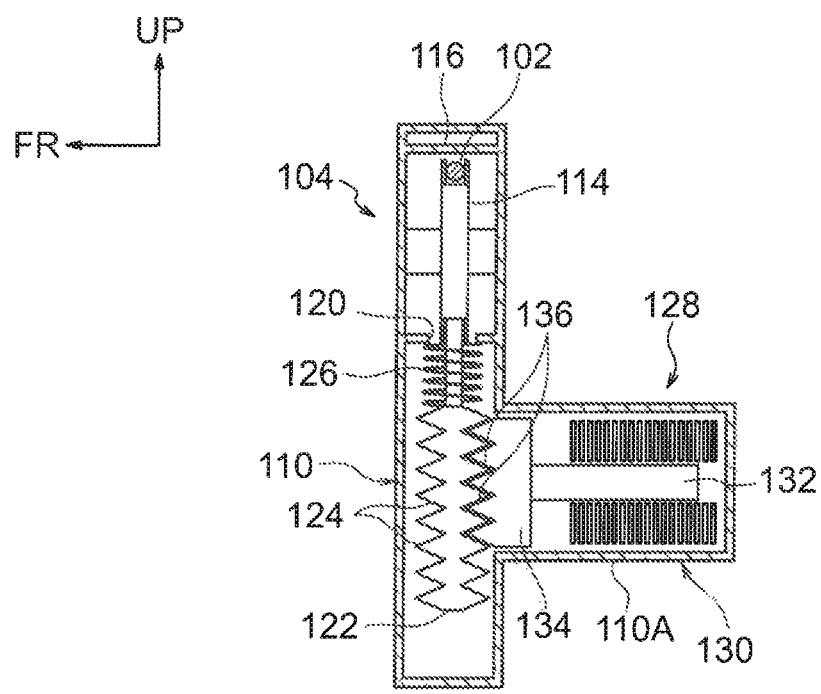
FIG. 25 is a sectional diagram corresponding to FIG. 22 and FIG. 24, showing an operated state of the stopper unit according to the fourth exemplary embodiment.

In a state in which no occupant P is sitting on the seat cushion 12, the movable member 122 described above is disposed at the lower limit position shown in FIG. 21 and FIG. 22. In this state, an intermediate portion of the wire 102 (a portion embedded in the seat cushion pad 32) is tensed into a linear shape in the seat width direction by the urging force of the compression coil spring 126. When an occupant P sits on the seat cushion 12 and the seat cushion top face 12A moves downward, an intermediate portion 102S of the wire 102 moves downward (flexes downward) to follow the downward movement of the seat cushion top face 12A. At this time, the movable member 122 is displaced upward, compressing the compression coil spring 126 (see FIG. 23 and FIG. 24).

The actuator 128 includes a push-type solenoid 130 and a pawl member 134. The actuator 128 is disposed at a seat rear side of the movable member accommodation chamber 118. An actuator accommodation portion 110A is formed at the support member 110 to correspond with the actuator 128. The actuator accommodation portion 110A bulges toward a seat rear side in the shape of a circular tube with a bottom. The interior of the actuator accommodation portion 110A communicates with the interior of the movable member accommodation chamber 118. The solenoid 130 and the pawl member 134 are accommodated inside the actuator accommodation portion 110A. The pawl member 134 is formed in an elongated shape of, for example, a metal. The pawl member 134 is disposed at a seat front side of the solenoid 130 (the side of the solenoid 130 at which the movable member accommodation chamber 118 is disposed) in an attitude in which the length direction of the pawl member 134 is in the seat vertical direction. The pawl member 134 is fixed to a distal end portion of a plunger 132 of the solenoid 130. Plural pawls 136 arrayed in the seat vertical direction are formed at a front end portion of the pawl member 134. The plural pawls 136 form substantially triangular shapes as seen in the seat width direction and are tapered towards the seat front side. The plural pawls 136 are arrayed with the same pitch (spacing) as the plural notches 124. The plural pawls 136 are meshed with the plural notches 124 by the solenoid 130 activating and moving the pawl member 134 toward the seat front side (see FIG. 25). Hence, downward sliding of the movable member 122 relative to the support member 110 is restricted, and feeding of the wire 102 from the support member 110 is restricted.

The solenoid 130 is electronically connected to an ECU, not shown in the drawings, which is installed in the vehicle 11. This ECU is electronically connected to the aforementioned collision prediction sensor. The collision prediction sensor is, for example, a millimeter-wave radar, a laser radar, a stereo camera and the like. When a front collision of the vehicle 11 is predicted by the collision prediction sensor, the ECU outputs an activation current to the solenoid 130. A timing at which the ECU feeds the activation current to the solenoid 130 may be a timing at which operation of a brake pedal is sensed by a brake sensor, a timing at which a rapid release operation of an accelerator pedal is sensed by an accelerator sensor, or the like. In these cases, the brake sensor or acceleration sensor serves as the collision prediction sensor.

In this exemplary embodiment, when the occupant P sits on the seat cushion 12, the intermediate portion 102S of the wire 102 moves downward following the downward movement of the seat cushion top face 12A, the movable member 122 slides upward relative to the support member 110, and the compression coil spring 126 is compressed. When the seat cushion top face 12A moves vertically due to vibrations during vehicle running, the wire 102 is moved vertically following the seat cushion top face 12A by restoring force of the compression coil spring 126. The wire 102 is more pliable than a rod member such as a metal pipe or the like and flexes to follow protrusion and recess deformations of the seat cushion top face 12A. Therefore, a sensation for the occupant of the wire 102 (the pelvis movement suppression member) as a foreign body may be even more effectively reduced. In addition, because the wire 102 flexes as described above, this foreign body sensation is likely to be reduced regardless of the physical build of the occupant P.

In this exemplary embodiment, when the collision prediction sensor predicts a collision of the vehicle 11, the plural pawls 136 formed at the pawl member 134 of the actuator 128 mesh with the plural notches 124 formed at the movable member 122. As a result, downward movement of the intermediate portion 102S of the wire 102 is restricted. Therefore, because downward movement of the wire 102 is restricted at a point in time before the pelvis area PL of the occupant P moves forward due to a rapid deceleration of the vehicle 11, forward movement of the pelvis area PL may be effectively suppressed, similarly to the exemplary embodiments described above. In addition, because the actuator 128 is employed as the stopper mechanism, an activation timing of the stopper mechanism may be specified arbitrarily.

In this exemplary embodiment, the other end side of the wire 102 is wound round the pulley 114 provided in the support member 110 of the vertical movement-enabling mechanism 104, and the movable member 122 is arranged with the length direction thereof in the seat vertical direction (a direction orthogonal to the seat width direction). Therefore, space for arrangement of the vertical movement-enabling mechanism 104 is more easily reserved than in, for example, a structure in which the movable member 122 is arranged with the length direction thereof in the seat width direction.

Fifth Exemplary Embodiment

Figure 26:
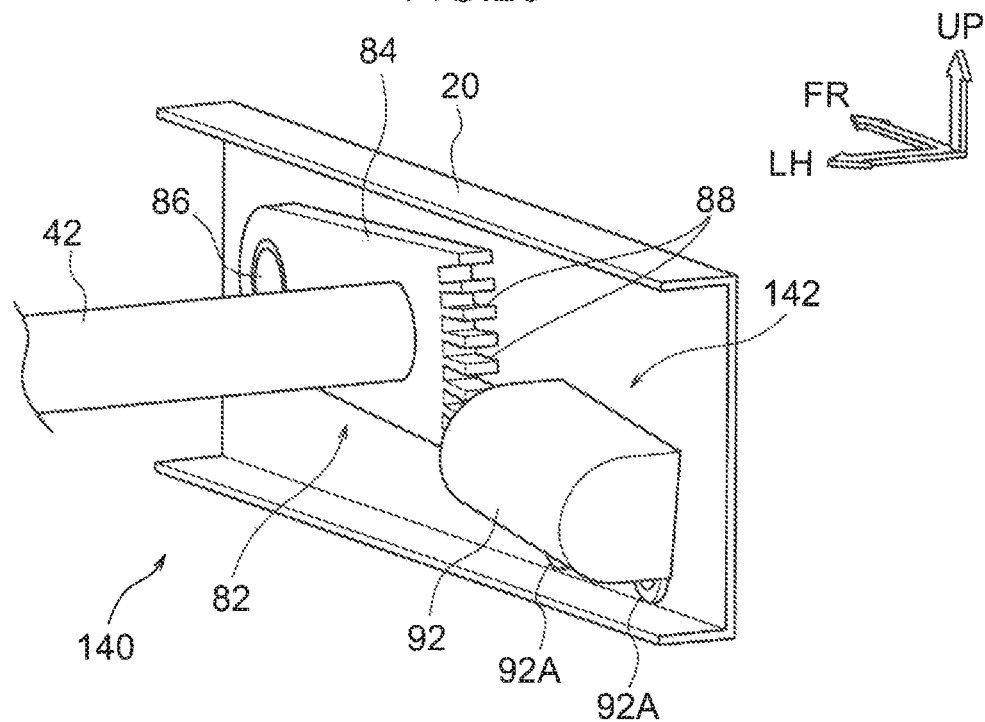
FIG. 26 is a perspective view showing neighboring structures including a portion of an occupant movement suppression apparatus provided at a vehicle seat according to a fifth exemplary embodiment of the present invention.

FIG. 26 is a perspective view showing neighboring structures including a portion of an occupant movement suppression apparatus 140 provided at a vehicle seat according to a fifth exemplary embodiment of the present invention. The occupant movement suppression apparatus 140 according to this exemplary embodiment resembles the second exemplary embodiment but differs in the following respects.

In the occupant movement suppression apparatus 140 according to this exemplary embodiment, the plural notches 88 formed in the rear end portion of the movable member 84 are formed in long, narrow, rectangular slot shapes in a seat width direction view, with length directions in the rotation radius direction of the movable member 84. These notches 88 extend from the rear end of the movable member 84 in directions toward the rotation center of the movable member 84. Similarly to the second exemplary embodiment, the notches 88 are specified within the range corresponding to the angle θ1 through which the movable member 84 rotates in the range in which the pelvis movement suppression member 42 moves vertically together with the seat cushion top face 12A.

The occupant movement suppression apparatus 140 is equipped with an actuator 142 that serves as the stopper mechanism in place of the stopper mechanism 90 according to the second exemplary embodiment. The actuator 142 is provided with a case 92, resembling the case 92 according to the second exemplary embodiment, and a pair of upper and lower pawl members 158 and 160. A rear portion of the interior of the case 92 is formed as an air chamber 144, which is divided from a front portion of the interior of the case 92 by a front-and-rear dividing wall 92C. Compressed air is charged into the air chamber 144. An upper and lower pair of electromagnetic valves 146 and 148 are mounted at the front-and-rear dividing wall 92C. The upper and lower electromagnetic valves 146 and 148 are electronically connected to an ECU similar to the ECU according to the fourth exemplary embodiment. When a collision prediction sensor similar to the collision prediction sensor according to the fourth exemplary embodiment predicts a front collision of the vehicle 11, this ECU outputs activation currents to the upper and lower electromagnetic valves 146 and 148. As a result, the upper and lower electromagnetic valves 146 and 148 are opened.

The upper and lower electromagnetic valves 146 and 148 are disposed to oppose a pair of upper and lower pawl accommodation chambers 150 and 152, which are formed in the front portion of the interior of the case 92. The upper and lower pawl accommodation chambers 150 and 152 are partitioned into upper and lower by an upper-and-lower division wall (not indicated with a reference symbol) in the case 92. The upper and lower pawl accommodation chambers 150 and 152 are independent from one another. When the upper and lower electromagnetic valves 146 and 148 are activated, the compressed air in the air chamber 144 flows into the upper and lower pawl accommodation chambers 150 and 152. The upper and lower pawl members 158 and 160 are accommodated in the upper and lower pawl accommodation chambers 150 and 152.

Figure 27:
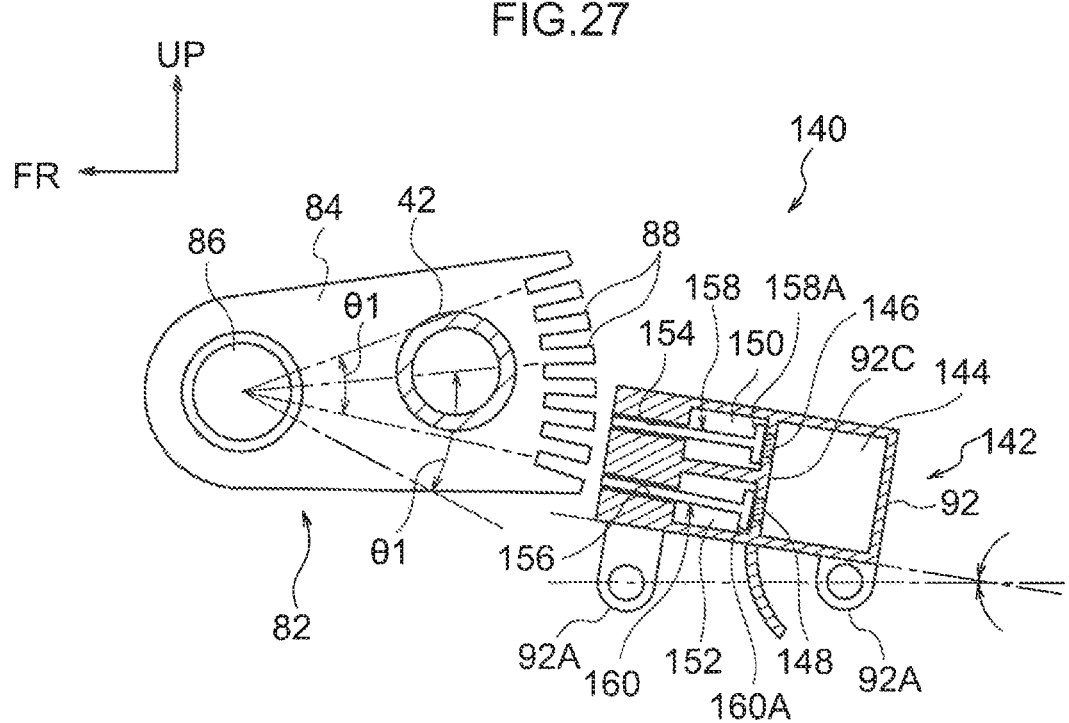
FIG. 27 is a partial sectional diagram in which a portion of the structure illustrated in FIG. 26 is seen from the left of the vehicle.

The upper and lower pawl members 158 and 160 are formed of, for example, a metal, and are formed in elongated shapes with the lengths thereof in the length direction of the case 92 (i.e., a direction that is angled a little upward toward the front relative to the seat front-and-rear direction). Front portions of the upper and lower pawl members 158 and 160 are inserted into a pair of upper and lower insertion holes 154 and 156 formed in a front wall portion (not indicated with a reference symbol) of the case 92. Flange-shaped pressure-receiving portions 158A and 160A are formed at rear end portions of the upper and lower pawl members 158 and 160. The pawl members 158 and 160 are supported to be slidable in the length directions thereof relative to the case 92. When the electromagnetic valves 146 and 148 are activated, the pawl members 158 and 160 are subjected to the pressure force of the compressed air flowing into the upper and lower pawl accommodation chambers 150 and 152, and slide from the positions shown in FIG. 27 towards a seat front side (more specifically, in directions towards the rotation center of the movable member 84. Vertical thicknesses of portions of the pawl members 158 and 160 other than the pressure-receiving portions 158A and 160A are specified to be substantially thinner than vertical widths of the notches 88. Thus, when the pawl members 158 and 160 slide towards the seat front side, a front end portion of either of the pawl members 158 and 160 meshes with one or other of the plural notches 88.

Figure 28:
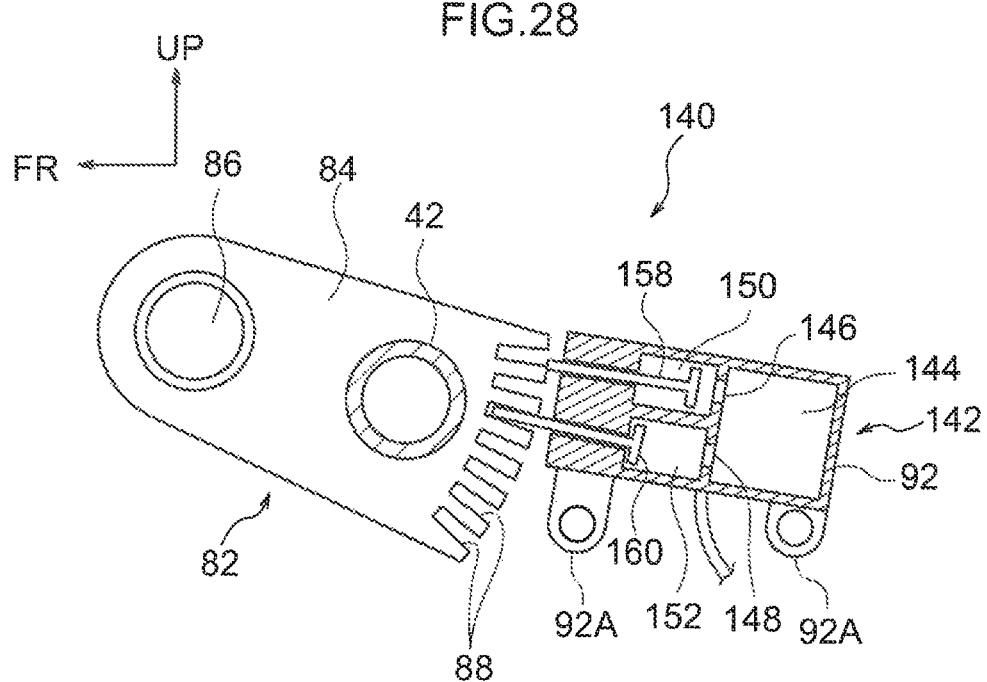
FIG. 28 is a partial sectional diagram corresponding to FIG. 27, showing an example of an activated state of the stopper unit.
Figure 29:
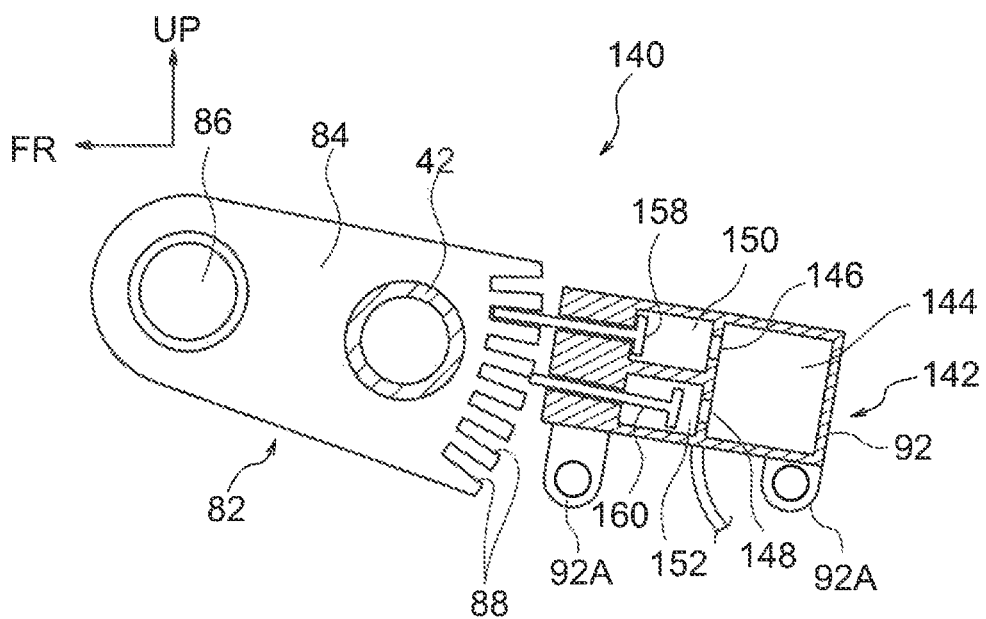
FIG. 29 is a partial sectional diagram corresponding to FIG. 27 and FIG. 28, showing an alternative example of the activated state of the stopper unit.

The upper and lower pawl members 158 and 160 are arrayed in the vertical direction with a spacing that differs slightly from the spacing (pitch) of the plural notches 88. Therefore, even though both of the upper and lower pawl members 158 and 160 slide toward the seat front side, only one of the upper and lower pawl members 158 and 160 meshes with one of the plural notches 88 (see FIG. 28 and FIG. 29). When one of the upper and lower pawl members 158 and 160 meshes with one of the plural notches 88, rotation of the movable member 84, and thus vertical movement of the pelvis movement suppression member 42, is restricted. The meaning of the term "a spacing that differs slightly" hereabove is intended to include spaces that are greater than the spacing of the plural notches 88 but less than twice the spacing of the plural notches 88.

In this exemplary embodiment too, when an occupant P is sitting at a usual time, the pelvis movement suppression member 42 rotates vertically to follow vertical movements of the seat cushion top face 12A. Therefore, similar effects to the second exemplary embodiment are provided. Furthermore, because the actuator 142 is employed as the stopper mechanism in this exemplary embodiment, the timing of activation of the stopper mechanism may be specified arbitrarily, similarly to the fourth exemplary embodiment. Moreover, in this exemplary embodiment, the spacing with which the upper and lower pawl members 158 and 160 are arrayed is specified to be slightly wider than the spacing of the plural notches 88. Therefore, when a collision of the vehicle 11 is predicted, there is a high probability of one of the upper and lower pawl members 158 and 160 meshing with one of the plural notches 88. This effect enables downward movement of the movable member 84, and thus the pelvis movement suppression member 42, to be restricted more reliably.

The actuator 142 according to this exemplary embodiment may also be applied to the first to fourth exemplary embodiments, in which cases the shapes of the plural notches formed in the movable member are to be modified to match the shapes of the pair of pawl members 158 and 160 of the actuator 142.

In the foregoing, a number of exemplary embodiments of the present invention have been described. However, numerous modifications of the exemplary embodiments may be embodied within a scope not departing from the claims. It will also be clear that the scope of the present disclosure is not to be limited to the exemplary embodiments described above.

What is claimed is:

1. A vehicle seat comprising:
    a collision prediction sensor;
    a seat cushion having a seat cushion top face and a seat cushion frame;
    a pelvis movement suppression member disposed along a seat width direction inside a front portion of the seat cushion;
    a vertical movement-enabling unit supporting the pelvis movement suppression member at the seat cushion frame and allowing vertical movement of the pelvis movement suppression member to follow vertical movement of the seat cushion top face; and
    a stopper unit attached to the seat cushion frame and, in a case in which a rapid deceleration of a vehicle is detected or a collision of the vehicle is predicted by the collision prediction sensor, restricting downward movement of the pelvis movement suppression member, wherein:
    the pelvis movement suppression member is rod shaped;
    the vertical movement-enabling unit includes a movable member that is supported so as to be vertically slidable relative to the seat cushion frame, an end portion in the seat width direction of the pelvis movement suppression member is fixed to the movable member, and a plurality of notches are arrayed vertically at the movable member; and
    the stopper unit includes a pawl member that restricts the downward movement of the pelvis movement suppression member by meshing with at least one of the plurality of notches at the movable member.

2. The vehicle seat according to claim 1, wherein a central portion in the seat width direction of the pelvis movement suppression member is inflected so as to protrude upward, and portions at both sides in the seat width direction of the pelvis movement suppression member are inflected so as to protrude downward.

3. The vehicle seat according to claim 1, wherein:
    a plurality of notches are at an end portion at a seat rear side of the movable member; and
    the stopper unit includes a moving member that moves toward a seat front side due to deceleration of the vehicle and the moving member causes the pawl member to mesh with at least one of the plurality of notches.

* * * * *